(12) United States Patent
Nagamura et al.

(10) Patent No.: US 8,773,745 B2
(45) Date of Patent: Jul. 8, 2014

(54) ELECTROCHROMIC MATERIAL

(75) Inventors: Toshihiko Nagamura, Fukuoka (JP);
Masaaki Ozawa, Funabashi (JP);
Akihiro Tanaka, Funabashi (JP);
Osamu Hirata, Funabashi (JP); Keisuke Odoi, Chiyoda-ku (JP); Takeshi Sakano, Fukuoka (JP)

(73) Assignees: Kyushu University, Fukuoka (JP);
Nissan Chemical Industries, Ltd., Tokyo (JP)

( * ) Notice: Subject to any disclaimer, the term of this patent is extended or adjusted under 35 U.S.C. 154(b) by 474 days.

(21) Appl. No.: 12/991,201

(22) PCT Filed: May 7, 2009

(86) PCT No.: PCT/JP2009/058645
§ 371 (c)(1),
(2), (4) Date: Jan. 31, 2011

(87) PCT Pub. No.: WO2009/136626
PCT Pub. Date: Nov. 12, 2009

(65) Prior Publication Data
US 2011/0149367 A1    Jun. 23, 2011

(30) Foreign Application Priority Data
May 7, 2008    (JP) ................................. 2008-121493

(51) Int. Cl.
*G02F 1/15*    (2006.01)
*C08F 8/30*    (2006.01)
*C09K 9/02*    (2006.01)

(52) U.S. Cl.
CPC ........... *C08F 8/30* (2013.01); *G02F 2001/1515* (2013.01); *C09K 2211/1029* (2013.01); *G02F 1/15* (2013.01); *C09K 9/02* (2013.01)
USPC ........................... 359/265; 525/279; 252/586

(58) Field of Classification Search
USPC ........................... 359/256; 525/279; 252/586
See application file for complete search history.

(56) References Cited

U.S. PATENT DOCUMENTS

| 4,841,058 A | * | 6/1989 | Endo et al. | 546/257 |
| 6,023,364 A | * | 2/2000 | Kobayashi et al. | 359/265 |
| 7,994,258 B2 | * | 8/2011 | Koga et al. | 525/328.2 |

(Continued)

FOREIGN PATENT DOCUMENTS

| JP | A-62-071934 | 4/1987 |
| JP | A-63-018336 | 1/1988 |

(Continued)

OTHER PUBLICATIONS

Miller et al. (J. Am. Chem. Soc. 1997, 119, 1005-1010).*

(Continued)

*Primary Examiner* — Shane Fang
(74) *Attorney, Agent, or Firm* — Oliff PLC

(57) ABSTRACT

The present invention relates to an electrochromic polymer compound composed of a hyperbranched polymer having electrochromic characteristics derived from a quaternary pyridinium salt, a terephthalic acid diester or a biphenyl-4,4'-diester structure, and a varnish, a thin film structure and an electrochromic device that are obtained by the polymer compound. The electrochromic material has high response speed, high coloring efficiency, and excellent repetition stability and can be used for a long time, and has excellent solubility in various solvents.

4 Claims, 7 Drawing Sheets

(56) References Cited

U.S. PATENT DOCUMENTS

| | | | |
|---|---|---|---|
| 2006/0009614 A1 | 1/2006 | Yamahara et al. | |
| 2007/0004902 A1* | 1/2007 | Dreyer et al. | 528/422 |
| 2008/0114128 A1 | 5/2008 | Destarac et al. | |

FOREIGN PATENT DOCUMENTS

| | | |
|---|---|---|
| JP | A-05-170738 | 7/1993 |
| JP | A-09-302073 | 11/1997 |
| JP | A-11-038454 | 2/1999 |
| JP | A-11-183940 | 7/1999 |
| JP | A-2003-121883 | 4/2003 |
| JP | A-2006-071767 | 3/2006 |
| JP | A-2007-091882 | 4/2007 |
| JP | A-2007-163865 | 6/2007 |
| JP | A-2007-537323 | 12/2007 |
| WO | WO 2004/009680 A2 | 1/2004 |
| WO | WO 2008/029688 A1 | 3/2008 |

OTHER PUBLICATIONS

International Search Report issued in Application No. PCT/JP2009/058645; Dated Jul. 14, 2009.

* cited by examiner

ELECTROCHROMIC MATERIAL

TECHNICAL FIELD

The present invention relates to electrochromic materials, and in particular, relates to electrochromic materials including hyperbranched polymers having compounds that exhibit electrochromic characteristics as a polymer moiety.

BACKGROUND ART

Electrochromic devices that are applied to light control devices and display devices use a phenomenon called electrochromism that, when voltage is applied, reversible oxidation-reduction reaction occurs, which leads to reversible coloration or discoloration. The electrochromic device is commonly composed of, for example, a device in which a transparent electrode substrate, an electrochromic layer, and a counter electrode substrate are sequentially provided.

Until now, as a compound having the electrochromic characteristics, for example, inorganic compounds such as tungsten oxide have been known (Patent Document 1), and a method in which a film of the inorganic oxide is formed on a transparent electrode by vacuum deposition method or sputtering method to manufacture an electrochromic device has been developed. However, the manufacturing method has a problem that vacuum technique is essential when forming the film and thus the cost increases.

As a device that can be manufactured at a lower cost and simpler manufacturing process, for example, various electrochromic devices using organic electrochromic compounds and the like including viologen derivatives and the like have been developed.

For example, viologen compounds for green electrochromic displays (Patent Document 2), electrochromic mirrors using polymer compounds having a viologen structure (Patent Document 3), and electrochromic devices including an electrolyte layer that is obtained by copolymerization of a precursor component of a solid polyelectrolyte and a reactive viologen compound (Patent Document 4) have been developed.

Furthermore, applications of hyperbranched polymers to electrochromic devices have been developed, and examples of them include triazine ring-containing multibranched polymers that exhibit electrochromic characteristics by doping of positive ions (Patent Document 5) and electrochromic devices that include, on the outer peripheral parts, a layer containing core-shell microspheres having a functional layer consisting of functional groups with an electrochromic function (the microspheres are, for example, dendrimers or hyperbranched polymers) (Patent Document 6).

RELATED ART DOCUMENTS

Patent Documents

Patent Document 1: Japanese Patent Application Publication No. JP-A-63-18336.
Patent Document 2: Japanese Patent Application Publication No. JP-A-5-170738.
Patent Document 3: Japanese Patent Application Publication No. JP-A-11-38454.
Patent Document 4: Japanese Patent Application Publication No. JP-A-11-183940.
Patent Document 5: Japanese Patent Application Publication No. JP-A-9-302073.
Patent Document 6: Japanese Patent Application Publication No. JP-A-2003-121883.

DISCLOSURE OF THE INVENTION

Problem to be Solved by the Invention

Previously developed organic electrochromic compounds have problems with response speed, coloring efficiency, repetition stability, and the like specifically from the viewpoint of the application to display devices in comparison with the performance of liquid crystal that is used for conventional display devices, and further improved performance is required.

The organic electrochromic compounds using polymer compounds such as hyperbranched polymers also have problems. For example, because the organic electrochromic compounds using polymer compounds have poor solubility in various organic solvents, usable solvents are limited, and thus it is difficult to form a thin film when the device is manufactured.

In view of the above, the present invention has an object to provide an electrochromic material that has high response speed, high coloring efficiency, and excellent repetition stability and can be used for a long time, and has excellent solubility in various solvents.

Means for Solving the Problem

The inventors of the present invention have carried out intensive studies in order to achieve the object. As a result, the inventors have found that a polymer material having excellent electrochromic characteristics and excellent solubility can be obtained by using a hyperbranched polymer including, as a part of the polymer, a moiety derived from a quaternary pyridinium salt-containing compound or a moiety of a terephthalic acid diester structure or a biphenyl-4,4'-diester structure each exhibiting electrochromic characteristics, in particular, by using a polymer compound in which the moiety derived from a quaternary pyridinium salt-containing compound or the moiety of a terephthalic acid diester structure or a biphenyl-4,4'-diester structure is provided at a branched chain end of the hyperbranched polymer. Thus, the present invention has been accomplished.

That is, as a first aspect, the present invention relates to an electrochromic material including a hyperbranched polymer having a moiety exhibiting electrochromic characteristics.

As a second aspect, the present invention relates to the electrochromic material according to the first aspect, characterized in that the moiety exhibiting electrochromic characteristics is derived from a compound including a quaternary pyridinium salt or is a moiety of a terephthalic acid diester structure or a moiety of a biphenyl-4,4'-diester structure.

As a third aspect, the present invention relates to the electrochromic material according to the first aspect, characterized in that the hyperbranched polymer is a compound of Formula (1) below:

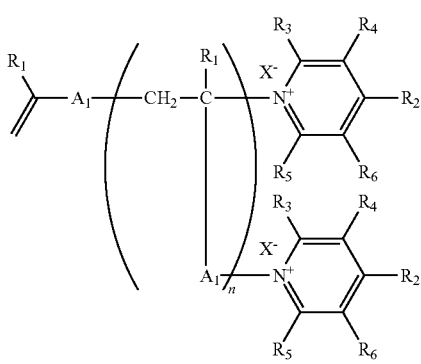

(1)

[where $R_1$ is a hydrogen atom or a methyl group, $R_2$ is a cyano group, a nitro group, a trifluoromethyl group, a 4-nitrostyryl group, a structure of Formula (2a), Formula (2b), or Formula (2c):

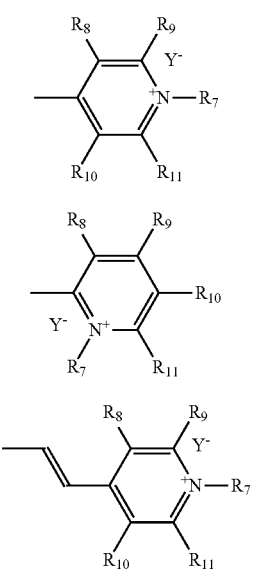

(in Formula (2a), Formula (2b), or Formula (2c), $R_7$ is a linear, branched, or cyclic $C_{1-30}$ alkyl group containing an ether linkage or an ester linkage, hydroxyalkyl group, alkenyl group, alkynyl group, aralkyl group, aryl group, or heterocyclic group, each of $R_8$ to $R_{11}$ is independently a hydrogen atom or a linear, branched, or cyclic $C_{1-30}$ alkyl group optionally containing an ether linkage or an ester linkage, and
$Y^-$ is a chlorine ion, a bromine ion, an iodine ion, $ClO_4^-$, $BF_4^-$, $PF_6^-$, $CH_3COO^-$, $PhSO_3^-$, 4-$MePhSO_3^-$, or $R_{12}SO_4^-$ (where Ph is a phenyl group, Me is a methyl group, and $R_{12}$ is a linear, branched, or cyclic $C_{1-30}$ alkyl group)),
a hydrogen atom, or a linear, branched, or cyclic $C_{1-30}$ alkyl group optionally containing an ether linkage or an ester linkage,
each of $R_3$ to $R_6$ is independently a hydrogen atom or a linear, branched, or cyclic $C_{1-30}$ alkyl group optionally containing an ether linkage or an ester linkage, or $R_3$ or $R_5$ is the structure of Formula (2a), Formula (2b), or Formula (2c) above,
$X^-$ is a chlorine ion, a bromine ion, an iodine ion, $ClO_4^-$, $BF_4^-$, $PF_6^-$, $CH_3COO^-$, $PhSO_3^-$, 4-$MePhSO_3^-$, or $R_{12}SO_4^-$ (where Ph is a phenyl group, Me is a methyl group, and $R_{12}$ is a linear, branched, or cyclic $C_{1-30}$ alkyl group),
$A_1$ is a structure of Formula (3):

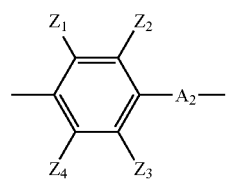

(3)

(in Formula (3), $A_2$ is a linear, branched, or cyclic $C_{1-30}$ alkylene group optionally containing an ether linkage or an ester linkage,
each of $Z_1$ to $Z_4$ is independently a hydrogen atom, a $C_{1-20}$ alkyl group, a $C_{1-20}$ alkoxy group, a nitro group, a hydroxy group, an amino group, a carboxy group, or a cyano group), and
n is the number of repeating unit structures and an integer of 2 to 100,000].

As a fourth aspect, the present invention relates to the electrochromic material according to the third aspect, characterized in that $A_1$ is a structure of Formula (4):

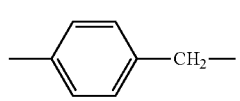

(4)

As a fifth aspect, the present invention relates to the electrochromic material according to the third aspect or the fourth aspect, in which each of $X^-$ and $Y^-$ is independently a chlorine ion, a bromine ion, or an iodine ion.

As a sixth aspect, the present invention relates to the electrochromic material according to the third aspect or the fourth aspect, characterized in that one of $X^-$ and $Y^-$ is a chlorine ion, a bromine ion, or an iodine ion, and the other is $PhSO_3^-$ or 4-$MePhSO_3^-$.

As a seventh aspect, the present invention relates to the electrochromic material according to any one of the third aspect to the sixth aspect, in which $R_7$ is a linear, branched, or cyclic $C_{1-30}$ alkyl group containing an ether linkage.

As an eighth aspect, the present invention relates to the electrochromic material according to the seventh aspect, in which $R_7$ is a linear, branched, or cyclic $C_{1-10}$ alkyl group substituted with a $C_{1-10}$ alkoxy group.

As a ninth aspect, the present invention relates to the electrochromic material according to the eighth aspect, in which $R_7$ is a $C_{1-10}$ alkyl group substituted with a branched $C_{1-10}$ alkoxy group, where the branched alkoxy group is branched at a carbon atom bonded to an oxygen atom.

As a tenth aspect, the present invention relates to the electrochromic material according to the eighth aspect, in which $R_7$ is a 2-methoxyethyl group or a 2-isopropoxyethyl group.

As an eleventh aspect, the present invention relates to the electrochromic material according to the tenth aspect, characterized in that $R_7$ is a 2-methoxyethyl group or a 2-isopropoxyethyl group, $X''$ is a bromine ion, and $Y^-$ is 4-$MePhSO_3^-$.

As a twelfth aspect, the present invention relates to the electrochromic material according to the eleventh aspect, characterized in that each of $R_3$, $R_5$, $R_9$, and $R_{11}$ is a methyl group.

As a thirteenth aspect, the present invention relates to the electrochromic material according to any one of the third aspect to the twelfth aspect, characterized in that the hyperbranched polymer has a weight average molecular weight of 500 to 5,000,000, in terms of polystyrene, measured by gel permeation chromatography.

As a fourteenth aspect, the present invention relates to the electrochromic material according to the first aspect, characterized in that the hyperbranched polymer is a polymer compound obtained by bonding a moiety of a terephthalic acid diester structure or a moiety of a biphenyl-4,4'-diester structure, as necessary through a linking group, to an end of a hyperbranched polymer that is obtained by polymerizing a monomer A having two or more radical polymerizable unsaturated double bonds in the molecule in the presence of a polymerization initiator B having an amount of 5% by mol to 200% by mol with respect to 1 mol of the monomer A.

As a fifteenth aspect, the present invention relates to the electrochromic material according to the fourteenth aspect, in which the monomer A is a compound including either at least two vinyl groups or at least two (meth)acrylic groups in one molecule.

As a sixteenth aspect, the present invention relates to the electrochromic material according to the fifteenth aspect, in which the monomer A is a divinyl compound or a di(meth)acrylate compound.

As a seventeenth aspect, the present invention relates to the electrochromic material according to the sixteenth aspect, in which the monomer A is divinylbenzene or ethylene glycol di(meth)acrylate.

As an eighteenth aspect, the present invention relates to the electrochromic material according to any one of the fourteenth aspect to the seventeenth aspect, in which the polymerization initiator B is an azo polymerization initiator.

As a nineteenth aspect, the present invention relates to the electrochromic material according to the eighteenth aspect, in which the polymerization initiator B is 2,2'-azobis[2-methyl-N-(2-hydroxyethyl)propionamide].

As a twentieth aspect, the present invention relates to the electrochromic material according to any one of the fourteenth aspect to the nineteenth aspect, in which the hyperbranched polymer is a polymer compound having a weight average molecular weight (Mw) of 1,000 to 200,000, in terms of polystyrene, measured by gel permeation chromatography.

As a twenty-first aspect, the present invention relates to a varnish that is characterized by including the electrochromic material as described in any one of the first aspect to the twentieth aspect, and the electrochromic material is dissolved or dispersed in at least one solvent.

As a twenty-second aspect, the present invention relates to a thin film structure that includes the electrochromic material as described in any one of the first aspect to the twentieth aspect.

As a twenty-third aspect, the present invention relates to an electrochromic device that includes a thin film structure having the electrochromic material as described in any one of the first aspect to the twentieth aspect, the thin film structure is interposed between two electrode layers, and at least one of the electrode layers is transparent.

Effects of the Invention

The electrochromic material of the present invention has electrochromic characteristics of high response speed, high coloring efficiency, excellent repetition stability, and capable of being used for a long time. Furthermore, because the coloring efficiency is extremely high, even when the film thickness is thin, high contrast can be obtained, and further thinned film can improve response speed.

Furthermore, because the electrochromic material of the present invention has the characteristics of polymer compounds, it can form a thin film structure by a simple coating and drying operation without special treatment. Moreover, the electrochromic material of the present invention can be dissolved in not only N,N'-dimethylformamide (DMF) and dimethylsulfoxide (DMSO) but also alcohols, water, and the like. Therefore, a varnish form can be obtained without limiting solvents, and a thin film structure can be formed.

BEST MODES FOR CARRYING OUT THE INVENTION

Figure 1:
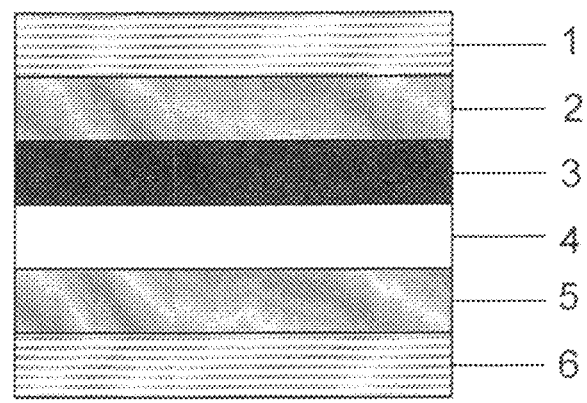
FIG. 1 is a sectional view showing a configuration example of the electrochromic device of the present invention.

The electrochromic material of the present invention is a hyperbranched polymer having, as a part of the polymer, a moiety derived from a quaternary pyridinium salt-containing compound, a moiety of a terephthalic acid diester structure, or a moiety of a biphenyl-4,4'-diester structure.

Examples of the hyperbranched polymer used in the present invention firstly include a compound having a structure of Formula (1) above.

In Formula (1), $R_1$ is a hydrogen atom or a methyl group, and $R_2$ is a cyano group, a nitro group, a structure of Formula (2a), Formula (2b), or Formula (2c) above, a hydrogen atom, or a linear, branched, or cyclic $C_{1-30}$ alkyl group optionally containing an ether linkage or an ester linkage. Each of $R_3$ to $R_6$ is independently a hydrogen atom or a linear, branched, or cyclic $C_{1-30}$ alkyl group optionally containing an ether linkage or an ester linkage, or $R_3$ or $R_5$ is a structure of Formula (2a), Formula (2b), or Formula (2c) above.

$X^−$ is a chlorine ion, a bromine ion, an iodine ion, $ClO_4^−$, $PF_6^−$, $CH_3COO^−$, $PhSO_3^−$, 4-$MePhSO_3^−$, or $R_{12}SO_4^−$ (where Ph is a phenyl group, Me is a methyl group, and $R_{12}$ is a linear, branched, or cyclic $C_{1-30}$ alkyl group).

n is the number of repeating unit structures and an integer of 2 to 100,000.

Furthermore, $A_1$ is a structure of Formula (3) above.

In Formula (2a), Formula (2b), or Formula (2c), $R_7$ is a linear, branched, or cyclic $C_{1-30}$ alkyl group containing an ether linkage or an ester linkage, hydroxyalkyl group, alkenyl group, alkynyl group, aralkyl group, aryl group, or heterocyclic group.

Each of $R_8$ to $R_{11}$ is independently a hydrogen atom or a linear, branched, or cyclic $C_{1-30}$ alkyl group optionally containing an ether linkage or an ester linkage.

$Y^−$ is a chlorine ion, bromine ion, an iodine ion, $ClO_4^−$, $BF_4^−$, $PF_6^−$, $CH_3COO^−$, $PhSO_3^−$, 4-$MePhSO_3^−$, or $R_{12}SO_4^−$ (where Ph is a phenyl group, Me is a methyl group, and $R_{12}$ is a linear, branched, or cyclic $C_{1-30}$ alkyl group).

In Formula (3), $A_2$ is a linear, branched, or cyclic $C_{1-30}$ alkylene group optionally containing an ether linkage or an ester linkage.

Each of $Z_1$ to $Z_4$ is independently a hydrogen atom, a $C_{1-20}$ alkyl group, a $C_{1-20}$ alkoxy group, a nitro group, a hydroxy group, an amino group, a carboxy group, or a cyano group.

In $R_2$ to $R_6$ in Formula (1), in $R_8$ to $R_{11}$ in Formula (2a), Formula (2b), or Formula (2c), and in $A_2$ in Formula (3), specific examples of the linear alkylene group include a methylene group, an ethylene group, a normal-propylene group, a normal-butylene group, and a normal-hexylene group. Furthermore, specific examples of the branched alkylene group include an isopropylene group, an isobutylene group, and a 2-methylpropylene group.

Examples of the cyclic alkylene group include a monocyclic, polycyclic, and cross-linked cyclic $C_{3-30}$ alicyclic-aliphatic group. Specific examples of the cyclic alkylene group include groups containing monocyclic, bicyclic, tricyclic, tetracyclic, and pentacyclic structures and the like each having 4 or more carbon atoms.

Examples of the linear, branched, or cyclic $C_{1-30}$ alkyl group containing an ether linkage or an ester linkage in $R_7$ in Formula (2a), Formula (2b), or Formula (2c) include groups in which an ether linkage or an ester linkage is contained in the linear, branched, or cyclic alkyl group described in the paragraph [0026].

More preferably, $R_7$ is a linear, branched, or cyclic $C_{1-30}$ alkyl group containing an ether linkage. In particular, in order to obtain a compound with less hygroscopic properties and deliquescent properties, $R_7$ is specifically preferably a $C_{1-10}$ alkyl group substituted with a $C_{1-10}$ alkoxy group, and most preferably, a $C_{1-10}$ alkyl group substituted with a branched $C_{1-10}$ alkoxy group, where the branched alkoxy group is branched at a carbon atom that is bonded to an oxygen atom.

Specific examples of $R_7$ include a methoxymethyl group, a 2-methoxyethyl group, an ethoxymethyl group, a 2-ethoxyethyl group, an isopropoxymethyl group, a 2-isopropoxyethyl group, a sec-butoxymethyl group, a 2-sec-butoxyethyl group, a cyclohexoxymethyl group, a 1-cyclohexoxyethyl group, a cyclopentoxymethyl group, and a 1-cyclopentoxyethyl group. $R_7$ is preferably 2-methoxyethyl group and 2-isopropoxyethyl group, and specifically preferably, 2-isopropoxyethyl group.

Examples of the $C_{1-30}$ hydroxyalkyl group in $R_7$ in Formula (2a), Formula (2b), or Formula (2c) include a hydroxymethyl group and a hydroxyethyl group. Examples of the alkenyl group include a vinyl group, a 1-propenyl group, a 1-butenyl group, and a cinnamyl group. Examples of the alkynyl group include an ethynyl group, a 1-propynyl group, and a 1-butynyl group. Examples of the aralkyl group include a benzyl group and a 2-phenylethyl group.

Furthermore, examples of the aryl group include a phenyl group, a biphenyl skeleton, a terphenyl group, and a naphthyl group. Examples of the heterocyclic group include a pyridyl group and a piperidinyl group.

In consideration of the solubility in solvents, each of $X^−$ in Formula (1) and $Y^−$ in Formula (2a), Formula (2b), or Formula (2c) is independently preferably a chlorine ion, a bromine ion, or an iodine ion.

Alternatively, it is preferable that one of $X^−$ and $Y^−$ in Formula (2a), Formula (2b), or Formula (2c) is a chlorine ion, a bromine ion, or an iodine ion and the other is $PhSO_3^−$ or 4-$MePhSO_3^−$. In particular, it is most preferable that $X^−$ is a bromine ion and $Y^−$ is 4-$MePhSO_3^−$.

Examples of the $C_{1-20}$ alkyl group in $Z_1$ to $Z_4$ in Formula (3) include a methyl group, an ethyl group, an isopropyl group, a cyclohexyl group, and a normal-pentyl group.

Furthermore, examples of the $C_{1-20}$ alkoxy group include a methoxy group, an ethoxy group, an isopropoxy group, a cyclohexoxy group, and a normal-pentoxy group.

Each of $Z_1$ to $Z_4$ is specifically preferably a hydrogen atom or a $C_{1-20}$ alkyl group.

<Method for Producing Hyperbranched Polymer of Formula (1)>

The hyperbranched polymer of Formula (1) can be produced by reacting a quaternary pyridinium salt-containing compound with a hyperbranched polymer of Formula (5) (hereinafter, also called HBPS-Hal).

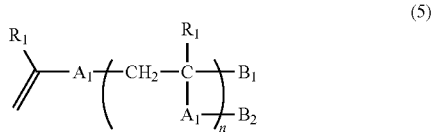

(5)

In Formula (5), $R_1$, $A_1$, and n are the same as the respective definitions in the above, and each of $B_1$ and $B_2$ is a halogen atom and is preferably a chlorine atom, a bromine atom, or an iodine atom.

HBPS-Hal of Formula (5) can be produced by, for example, synthesizing a branched photopolymerizable polymer having dithiocarbamate groups at the molecular ends (the groups corresponding to $B_1$ and $B_2$ in Formula (5)), for example, by the synthetic method using photopolymerization of a styrene compound having a dithiocarbamate group (Koji Ishizu, Akihide Mori, Macromol. Rapid Commun. 21, 665-668 (2000), Koji Ishizu, Akihide Mori, Polymer International 50, 906-910 (2001), and Koji Ishizu, Yoshihiro Ohta, Susumu Kawauchi, Macromolecules Vol. 35, No. 9, 3781-3784 (2002)) or by the synthetic method using photopolymerization of an acrylic compound having a dithiocarbamate group (Koji Ishizu, Takeshi Shibuya, Akihide Mori, Polymer International 51, 424-428 (2002), Koji Ishizu, Takeshi Shibuya, Susumu Kawauchi, Macromolecules Vol. 36, No. 10, 3505-3510 (2002), and Koji Ishizu, Takeshi Shibuya, Jaebum Park, Satoshi Uchida, Polymer International 53, 259-265 (2004)), and then halogenating the dithiocarbamate group.

Specifically, a dithiocarbamate compound of Formula (6) below is living radical-polymerized, and then the dithiocarbamate group is halogenated to produce HBPS-Hal of Formula (5) above.

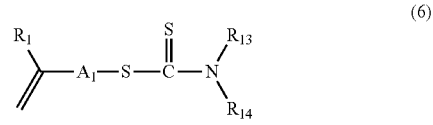

(6)

In Formula (6), $R_1$ and $A_1$ are the same as the respective definitions in the above, each of $R_{13}$ and $R_{14}$ is independently a $C_{1-5}$ alkyl group, a $C_{1-5}$ hydroxyalkyl group, or a $C_{7-42}$ arylalkyl group, or $R_{13}$ and $R_{14}$ are optionally bonded to each other to form a ring together with a nitrogen atom.

Examples of the $C_{1-5}$ alkyl group include a methyl group, an ethyl group, an isopropyl group, a tert-butyl group, a cyclopentyl group, and a normal-pentyl group.

Examples of the $C_{1-5}$ hydroxyalkyl group include a hydroxymethyl group, a hydroxyethyl group, and a hydroxypropyl group.

Examples of the $C_{7-12}$ arylalkyl group include a benzyl group and a phenethyl group.

Examples of the ring formed by $R_{13}$ and $R_{14}$ bonded to each other together with a nitrogen atom that is bonded to $R_{13}$ and $R_{14}$ include four- to eight-membered rings. As the ring, rings containing 4 to 6 methylene groups are exemplified. Rings containing an oxygen atom or a sulfur atom and 4 to 6 methylene groups are also exemplified.

Specific examples of the ring formed by $R_{13}$ and $R_{14}$ bonded to each other together with a nitrogen atom that is bonded to $R_{13}$ and $R_{14}$ include a piperidine ring, a pyrrolidine ring, a morpholine ring, a thiomorpholine ring, and a homopiperidine ring.

The living radical polymerization of the compound of Formula (6) can be carried out in known polymerization manners such as bulk polymerization, solution polymerization, suspension polymerization, and emulsification polymerization. The solution polymerization in an organic solvent solution is preferred.

In the case of the solution polymerization, a dithiocarbamate compound of Formula (6) can be polymerized at any concentration in an organic solvent solution that can dissolve the compound. In this case, the concentration of the dithiocarbamate compound of Formula (6) in a solution may be freely selected, but for example, the concentration is 1 to 80% by mass, preferably 2 to 70% by mass, and more preferably 5 to 60% by mass.

The organic solvent is not specifically limited as far as the solvent can dissolve the dithiocarbamate compound of Formula (6). Examples of the organic solvent include aromatic hydrocarbons such as benzene, toluene, xylene, and ethylbenzene, ether compounds such as tetrahydrofuran and diethyl ether, ketone compounds such as acetone, methyl ethyl ketone, methyl isobutyl ketone, and cyclohexanone, and aliphatic hydrocarbons such as normal-heptane, normal-hexane, and cyclohexane. These organic solvents may be used alone or as a mixture of two or more of them.

The living radical polymerization of a dithiocarbamate compound of Formula (6) can be carried out in an organic solvent solution by heating or photoirradiation of ultraviolet rays and the like, but is preferably carried out by the photoirradiation of ultraviolet rays and the like. The photoirradiation can be carried out with an ultraviolet ray irradiation lamp such as a low pressure mercury lamp, a high pressure mercury lamp, an extra-high pressure mercury lamp, and a xenon lamp, and by internal or external irradiation of a reaction system.

For the living radical polymerization, before the start of the polymerization, oxygen in the reaction system needs to be thoroughly removed, and is preferably replaced with an inert gas such as nitrogen or argon in the system.

The polymerization time is 0.1 to 100 hours, preferably 1 to 50 hours, and more preferably 3 to 30 hours. Generally, with the progress of the polymerization time, the conversion rate of monomers (a dithiocarbamate compound of Formula (6)) increases. The polymerization temperature is not specifically limited, but is 0 to 200° C., preferably 10 to 150° C., and more preferably 20 to 100° C.

During the living radical polymerization of the dithiocarbamate compound of Formula (6), a chain transfer agent such as mercaptans and sulfides or a sulfide compound such as tetraethylthiuram disulfide may be used in order to control the molecular weight and the molecular weight distribution. Furthermore, as desired, an antioxidant such as hindered phenols, an ultraviolet absorber such as benzotriazoles, and a polymerization inhibitor such as 4-tert-butylcatechol, hydroquinone, nitrophenol, nitrocresol, picric acid, phenothiazine, and dithiobenzoyl disulfide may be used.

Furthermore, during the living radical polymerization, known vinyl monomers without any dithiocarbamate group or compounds with unsaturated double bonds may be added in order to control the degree of branching or the degree of polymerization. These compounds can be used with a ratio of less than 50% by mol with respect to the total amount of the dithiocarbamate compound of Formula (6). Specific examples of these compounds include styrenes, vinylbiphenyls, vinylnaphthalenes, vinylanthracenes, acrylic acid esters, methacrylic acid esters, acrylamides, methacrylamides, vinylpyrrolidones, acrylonitriles, maleic acids, maleimides, divinyl compounds, and trivinyl compounds.

The dithiocarbamate compound of Formula (6) above can readily be obtained by a nucleophilic substitution reaction of a compound of Formula (7) below and a compound of Formula (8) below:

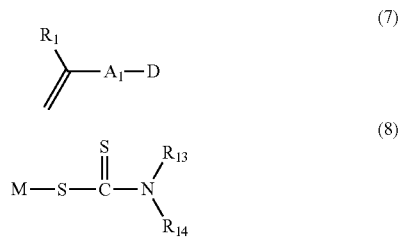

In Formula (7), $R_1$ and $A_1$ are the same as the respective definitions in the above, and D is a leaving group. Examples of the leaving group include a fluoro group, a chloro group, a bromo group, an iodine group, a mesyl group, and a tosyl group. In Formula (8), $R_{13}$ and $R_{14}$ are the same as the respective definitions in the above, and M is lithium, sodium, or potassium.

The nucleophilic substitution reaction is commonly preferably carried out in an organic solvent that can dissolve both of the two types of compounds. After the reaction, a dithiocarbamate compound of Formula (6) can be obtained with a high purity by liquid separation treatment with water and a nonaqueous organic solvent or recrystallization treatment. Furthermore, a dithiocarbamate compound of Formula (6) can be produced with reference to the method described in Macromol. Rapid Commun. 21, 665-668 (2000) or Polymer International 51, 424-428 (2002).

Specific examples of the dithiocarbamate compound of Formula (6) include N,N'-diethyldithiocarbamylmethylstyrene.

The hyperbranched polymer of Formula (5) above can be obtained by substituting the dithiocarbamate group at the molecular end in the hyperbranched polymer as obtained above with a halogen atom.

The halogenation method is not specifically limited as far as the dithiocarbamate group can be converted into a halogen atom. Examples of the halogenating agent usable in the reaction include chlorinating agents such as chlorine, N-chlorosuccinimide, chlorinated isocyanuric acid, sulfuryl chloride, tert-butyl hypochloride, phosphorus trichloride, phosphorus pentachloride, triphenylphosphine dichloride, cupric chloride, and antimony pentachloride, brominating agents such as bromine, N-bromosuccinimide, N-bromoglutarimide, N,N', N''-tribromoisocyanuric acid, sodium N,N'-dibromoisocyanurate, potassium N,N'-dibromoisocyanurate, N,N'-dibromoisocyanuric acid, sodium N-bromoisocyanurate, N,N'-dibromohydantoin, potassium N-bromohydantoin, sodium N,N'-dibromohydantoin, N-bromo-N-methylhydantoin, 1,3-dibromo-5,5'-dimethylhydantoin, 3-bromo-5,5'-dimethylhydantoin, 3-bromo-5,5'-dimethylhydantoin, sodium 1-bromo-5,5'-dimethylhydantoin, potassium 1-bromo-5,5'-dimethylhydantoin, sodium 3-bromo-5,5'-dimethylhydantoin, and potassium 3-bromo-5,5'-dimethylhydantoin, and iodinating agents such as iodine, N-iodosuccinimide, potassium iodate, potassium periodate, periodic acid, and iodic acid. The amount used of the halogenating agent is 1- to 20-fold molar equivalents, preferably 1.5- to 15-fold molar equivalents, and more preferably 2- to 10-fold molar equivalents, with respect to the number of dithiocarbamate groups in the hyperbranched polymer. The conditions of the substitution reaction are suitably selected from a reaction time of 0.01 to 100 hours and a reaction temperature of 0 to 300° C. Preferably, the reaction time is 0.1 to 10 hours and the reaction temperature is 20 to 150° C.

The substitution reaction of the dithiocarbamate group at the molecular end into a halogen atom is preferably carried out in water or an organic solvent. A preferable solvent to be used is a solvent that can dissolve the hyperbranched polymer having dithiocarbamate groups and a halogenating agent. Furthermore, the same solvent as that used to produce the hyperbranched polymer having dithiocarbamate groups is preferred due to an easy reaction operation.

A preferable halogenating method is the reaction by heating and refluxing with a halogenating agent such as bromine in an organic solvent solution. Any organic solvent can be used as far as the progression of the reaction is not remarkably inhibited, and examples of the solvent usable include organic acid solvents such as acetic acid; aromatic hydrocarbons such as benzene, toluene, xylene, ethylbenzene, and ortho-dichlorobenzene; ether compounds such as tetrahydrofuran and diethyl ether; ketone compounds such as acetone, methyl ethyl ketone, methyl isobutyl ketone, and cyclohexanone; and aliphatic hydrocarbons such as chloroform, dichloromethane, 1,2-dichloroethane, normal-heptane, normal-hexane, and cyclohexane. These solvents may be used alone or as a mixture of two or more of them. Preferably, the mass of the organic solvent to be used is 0.2 to 1,000 times the mass, preferably 1 to 500 times the mass, more preferably 5 to 100 times the mass, and most preferably 10 to 50 times the mass, of the hyperbranched polymer having dithiocarbamate groups at the molecular ends. Furthermore, for the reaction, before the start of the reaction, oxygen in the reaction system needs to be thoroughly removed, and is preferably replaced with an inert gas such as nitrogen or argon in the system. The reaction conditions are suitably selected from a reaction time of 0.01 to 100 hours and a reaction temperature of 0 to 200° C. Preferably, the reaction time is 0.1 to 5 hours and the reaction temperature is 20 to 150° C.

After the reaction, the halogenating agent remaining in the system is preferably decomposed. For the treatment, an aqueous solution of a reducing agent such as sodium thiosulfate and sodium sulfite or an aqueous solution of alkali such as sodium hydroxide, potassium hydroxide, and calcium hydroxide can be used. Furthermore, the halogenating agent may be reacted with an unsaturated bond-containing compound such as ethylene, propylene, butene, and cyclohexene. The amount used is 0.1 to 50 equivalents, preferably 0.5 to 10 equivalents, and more preferably 1 to 3 equivalents, with respect to the amount of the used halogenating agent. The hyperbranched polymer having halogen atoms at the molecular ends obtained by the reaction can be separated from the solvent in the reaction solution by solvent removal through distillation or solid-liquid separation. Furthermore, the reaction solution is added to a poor solvent to precipitate the hyperbranched polymer having halogen atoms at the molecular ends, and then the polymer can be recovered as powder.

The hyperbranched polymer having halogen atoms at the molecular ends of Formula (5) (HBPS-Hal) obtained in this manner is reacted with a quaternary pyridinium salt-containing compound to produce a polymer compound having a moiety exhibiting electrochromic characteristics of Formula (1).

Examples of the quaternary pyridinium salt-containing compound to be reacted with HBPS-Hal of Formula (5)

include salts of pyridine, its derivatives, viologen, and its derivatives. Examples of the salt include halide salts (such as a chloride salt, a bromide salt, and an iodide salt), perhalogenates (such as a perchlorate, a perbromate, and a periodate), organic acid salts (such as an acetate, a sulfonate, a benzenesulfonate, a trifluoromethanesulfonate, and a p-toluenesulfonate), and inorganic acid salts (such as a sulfate, a nitrate, a tetrafluoroborate, a hexafluorophosphate, and an acetate). Among them, preferred salts are a chloride salt, a bromide salt, an iodide salt, a perchlorate, an acetate, a benzenesulfonate, a p-toluenesulfonate, a sulfonate, a tetrafluoroborate, a hexafluorophosphate, and the like, and most preferred salts are a chloride salt, a bromide salt, a benzenesulfonate, a p-toluenesulfonate, a sulfonate, and a tetrafluoroborate.

Specifically preferred examples of the compound include the salts exemplified above of 4,4'-bipyridinium derivatives, 2,2',6,6'-tetramethyl-4,4'-bipyridinium derivatives, 4-cyanopyridinium derivatives, 4-trifluoromethylpyridinium derivatives, and 4-nitrostyrylpyridinium derivatives.

Furthermore, compounds of General Formula shown below can be exemplified as suitable compounds.

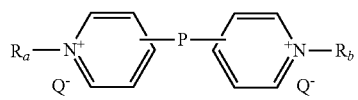

In Formula above, P is a thiophenyl group, a furyl group, a bithiophenyl group, a terthiophenyl group, a fluorenyl group, a pyrenyl group, a perylenyl group, a vinyl group, or a single bond each bonded to the 4-position or the 2-position with respect to the nitrogen atom in the bipyridinium group, each of $R_a$ and $R_b$ is independently an alkyl group, poly(tetramethyleneoxy) group, a hydroxyalkyl group, an alkenyl group, an alkynyl group, an aralkyl group, an aryl group, or a heterocyclic group, and $Q^-$ is a chlorine ion, a bromine ion, an iodine ion, $ClO_4^-$, $BE_4^-$, $PF_6^-$, $CH_3COO^-$, $PhSO_3^-$, 4-Me-PhSO_3^-$, or $R_{12}SO_4^-$ (where Ph is a phenyl group, Me is a methyl group, and $R_{12}$ is a linear, branched, or cyclic $C_{1-30}$ alkyl group).

The reaction of HBPS-Hal of Formula (5) and the quaternary pyridinium salt-containing compound can be carried out in an organic solvent in the presence of a corresponding base. The amount used of the corresponding base is 0.1- to 20-fold molar equivalents, preferably 0.5- to 10-fold molar equivalents, and more preferably 1- to 5-fold molar equivalents, with respect to 1 molar equivalent of a halogen atom in HBPS-Hal of Formula (5).

A preferable solvent to be used may be any solvent that can dissolve the quaternary pyridinium salt-containing compound and HBPS-Hal of Formula (5), and a solvent not dissolving a polymer compound after the reaction is more preferred. Examples of the solvent to be used include aromatic hydrocarbons such as benzene, toluene, xylene, ethylbenzene, and ortho-dichlorobenzene; ether compounds such as tetrahydrofuran and diethyl ether; ketone compounds such as acetone, methyl ethyl ketone, methyl isobutyl ketone, and cyclohexanone; aliphatic hydrocarbons such as chloroform, dichloromethane, 1,2-dichloroethane, normal-heptane, normal-hexane, and cyclohexane; amide compounds such as N,N'-dimethylformamide, N,N'-dimethylacetamide, and N-methyl-2-pyrrolidone; and dimethylsulfoxide. These solvents may be used alone or as a mixture of two or more of them. Furthermore, preferably, the mass of the organic solvent to be used is 0.2 to 1,000 times the mass, preferably 1 to 500 times the mass, more preferably 5 to 100 times the mass, and most preferably 10 to 50 times the mass, of HBPS-Hal of Formula (5).

Furthermore, for the reaction, before the start of the reaction, oxygen in the reaction system needs to be thoroughly removed, and is preferably replaced with an inert gas such as nitrogen or argon in the system.

The reaction conditions are suitably selected from a reaction temperature of 0 to 300° C. and a reaction time of 0.01 to 100 hours. Preferably, the reaction temperature is 20 to 150° C. and the reaction time is 0.1 to 10 hours.

The electrochromic material of the present invention that is the hyperbranched polymer of Formula (1) produced in this manner has a weight average molecular weight Mw of 500 to 5,000,000, preferably 1,000 to 1,000,000, more preferably 2,000 to 500,000, and most preferably 3,000 to 100,000, in terms of polystyrene, measured by gel permeation chromatography. Furthermore, the degree of distribution: Mw (weight average molecular weight)/Mn (number average molecular weight) is 1.0 to 7.0, preferably 1.1 to 6.0, and more preferably 1.2 to 5.0.

In addition to the hyperbranched polymer of Formula (1) above, examples of the electrochromic material of the present invention include a polymer compound obtained by bonding a moiety of a terephthalic acid diester structure or a moiety of a biphenyl-4,4'-diester structure, as necessary through a linking group, to the ends of a hyperbranched polymer (hereinafter, also called H-DVB-OH) that is obtained by polymerizing a monomer A having two or more radical polymerizable unsaturated double bonds in the molecule in the presence of a polymerization initiator B having an amount of 5% by mol to 200% by mol with respect to 1 mol of the monomer A.

The monomer A having two or more radical polymerizable unsaturated double bonds in the molecule preferably includes either at least two vinyl groups or at least two (meth)acrylic groups, and specifically preferably is a divinyl compound or a di(meth)acrylate compound. In the present specification, a (meth)acrylate compound means both an acrylate compound and a methacrylate compound. For example, (meth)acrylic acid means acrylic acid and methacrylic acid.

As such monomer A, organic compounds described in (A1) to (A7) below are exemplified.
(A1) Vinyl hydrocarbons:
(A1-1) aliphatic vinyl hydrocarbons such as isoprene, butadiene, 3-methyl-1,2-butadiene, 2,3-dimethyl-1,3-butadiene, 1,2-polybutadiene, pentadiene, hexadiene, and octadiene;
(A1-2) alicyclic vinyl hydrocarbons such as cyclopentadiene, cyclohexadiene, cyclooctadiene, and norbornadiene; and
(A1-3) aromatic vinyl hydrocarbons such as divinylbenzene, divinyltoluene, divinylxylene, trivinylbenzene, divinylbiphenyl, divinylnaphthalene, divinylfluorene, divinylcarbazole, and divinylpyridine.
(A2) Vinyl esters, allyl esters, vinyl ethers, allyl ethers, and vinyl ketones:
(A2-1) vinyl esters such as divinyl adipate, divinyl maleate, divinyl phthalate, divinyl isophthalate, divinyl itaconate, and vinyl(meth)acrylate;
(A2-2) allyl esters such as diallyl maleate, diallyl phthalate, diallyl isophthalate, diallyl adipate, and allyl(meth)acrylate;
(A2-3) vinyl ethers such as divinyl ether, diethylene glycol divinyl ether, and triethylene glycol divinyl ether;
(A2-4) allyl ethers such as diallyl ether, diallyloxyethane, triallyloxyethane, tetraallyloxyethane, tetraallyloxypropane, tetraallyloxybutane, and tetramethallyloxyethane; and
(A2-5) vinyl ketones such as divinyl ketone and diallyl ketone.

(A3) (Meth)acrylic acid esters:
ethylene glycol di(meth)acrylate, triethylene glycol di(meth)acrylate, propylene glycol di(meth)acrylate, neopentyl glycol di(meth)acrylate, trimethyloipropane tri(meth)acrylate, glycerol tri(meth)acrylate, pentaerythritol tetra(meth)acrylate, alkoxytitanium tri(meth)acrylates, 1,6-hexanediol di(meth)acrylate, 2-methyl-1,8-octanediol di(meth)acrylate, 1,9-nonanediol di(meth)acrylate, 1,10-decanediol di(meth)acrylate, tricyclodecanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecylenoxy ethylene glycol di(meth)acrylate, bis[4-(meth)acryloylthiophenyl]sulfide, bis[2-(meth)acryloylthioethyl]sulfide, 1,3-adamantanediol di(meth)acrylate, 1,3-adamantanedimethanol di(meth)acrylate, and the like.

(A4) Vinyl compounds having polyalkylene glycol chains:
polyethylene glycol (molecular weight 300) di(meth)acrylate, polypropylene glycol (molecular weight 500) di(meth)acrylate, and the like.

(A5) Nitrogen-containing vinyl compounds:
diallylamine, diallyl isocyanurate, diallyl cyanurate, methylenebis(meth)acrylamide, bismaleimide, and the like.

(A6) Silicon-containing vinyl compounds:
dimethyldivinylsilane, divinylmethylphenylsilane, diphenyldivinylsilane, 1,3-divinyl-1,1,3,3-tetramethyldisilazane, 1,3-divinyl-1,1,3,3-tetraphenyldisilazane, diethoxydivinylsilane, and the like.

(A7) Fluorine-containing vinyl compounds:
1,4-divinylperfluorobutane, 1,4-divinyloctafluorobutane, 1,6-divinylperfluorohexane, 1,6-divinyldodecalluorohexane, 1,8-divinylperfluorooctane, 1,8-divinylhexadecafluorooctane, and the like.

Among them, preferred examples of the monomer A include aromatic vinyl hydrocarbon compounds in the group (A1-3); vinyl esters, allyl esters, vinyl ethers, allyl ethers, and vinyl ketones in the group (A2); (meth)acrylic acid esters in the group (A3); vinyl compounds having polyalkylene glycol chains in the group (A4); and nitrogen-containing vinyl compounds in the group (A5). Specifically preferred examples include divinylbenzene in the group (A1-3), diallyl phthalate in the group (A2), ethylene glycol di(meth)acrylate and 1,3-adamantanedimethanol di(meth)acrylate in the group (A3), and methylenebis(meth)acrylamide in the group (A5). Among them, divinylbenzene and ethylene glycol di(meth)acrylate are more preferred.

As the polymerization initiator B, an azo polymerization initiator is preferably used. As the azo polymerization initiator, compounds described in (1) to (5) below are exemplified.

(1) azonitrile compounds:
2,2'-azobisisobutyronitrile, 2,2'-azobis(2-methylbutyronitrile), 2,2'-azobis-2,4-dimethylvaleronitrile, 1,1'-azobis-1-cyclohexanecarbonitrile, 2,2'-azobis-4-methoxy-2,4-dimethylvaleronitrile, 2-(carbamoylazo)isobutyronitrile, and the like;

(2) azoamide compounds:
2,2'-azobis{2-methyl-N-[1,1-bis(hydroxymethyl)-2-hydroxyethyl]propionamide},
2,2'-azobis {2-methyl-N-[2-(1-hydroxybutyl)]propionamide},
2,2'-azobis[2-methyl-N-(2-hydroxyethyl)propionamide],
2,2'-azobis[N-(2-propenyl)-2-methylpropionamide],
2,2'-azobis(N-butyl-2-methylpropionamide),
2,2'-azobis(N-cyclohexyl-2-methylpropionamide), and the like;

(3) cyclic azoamidine compounds:
2,2'-azobis[2-(2-imidazoline-2-yl)propane]dihydrochloride,
2,2'-azobis[2-(2-imidazoline-2-yl)propane]disulfate dihydrate,
2,2'-azobis[2-[1-(2-hydroxyethyl)-2-imidazoline-2-yl]-propane]dihydrochloride,
2,2'-azobis[2-(2-imidazoline-2-yl)propane],
2,2'-azobis(1-imino-1-pyrrolidino-2-methylpropane) dihydrochloride, and the like;

(4) azoamidine compounds:
2,2'-azobis(2-methylpropionamidine) dihydrochloride,
2,2'-azobis[N-(2-carboxyethyl)-2-methylpropionamidine] tetrahydrate, and the like; and (5) others:
dimethyl 2,2'-azobisisobutyrate, 4,4'-azobis-4-cyanovaleric acid,
2,2'-azobis(2,4,4-trimethylpentane), 1,1'-azobis(1-acetoxy-1-phenylethane), and the like.

Among the azo polymerization initiators, an azo polymerization initiator having a 10-hour half-life temperature of 30 to 120° C. is preferred.

As the azo polymerization initiator satisfying such requirements, among the azo polymerization initiators, 2,2'-azobis [2-methyl-N-(2-hydroxyethyl)propionamide] is specifically preferred.

The amount used of the polymerization initiator B is 5% by mol to 200% by mol, preferably 20% by mol to 150% by mol, and more preferably 50% by mol to 100% by mol, with respect to 1 mol of the monomer A having two or more radical polymerizable unsaturated double bonds in the molecule.

When the monomer A is polymerized in the presence of a predetermined amount of the polymerization initiator B for producing H-DVB-OH, examples of the polymerization method include known methods such as solution polymerization, dispersion polymerization, precipitation polymerization, and bulk polymerization. Among them, the solution polymerization or the precipitation polymerization is preferred. In particular, from the view point of molecular weight control, solution polymerization in an organic solvent is preferred for carrying out the reaction.

Examples of the organic solvent used here include aromatic hydrocarbon solvents such as benzene, toluene, xylene, ethylbenzene, and tetralin; aliphatic or alicyclic hydrocarbon solvents such as n-hexane, n-heptane, mineral spirits, and cyclohexane; halogenated solvents such as methyl chloride, methyl bromide, methyl iodide, methylene dichloride, chloroform, carbon tetrachloride, trichloroethylene, perchloroethylene, and ortho-dichlorobenzene; ester or ester-ether solvents such as ethyl acetate, butyl acetate, methoxybutyl acetate, methyl cellosolve acetate, ethyl cellosolve acetate, propylene glycol monomethyl ether acetate; ether solvents such as diethyl ether, tetrahydrofuran, 1,4-dioxane, ethyl cellosolve, butyl cellosolve, and propylene glycol monomethyl ether; ketone solvents such as acetone, methyl ethyl ketone, methyl isobutyl ketone, di-n-butyl ketone, and cyclohexanone; alcohol solvents such as methanol, ethanol, n-propanol, isopropanol, n-butanol, isobutanol, tert-butanol, 2-ethylhexyl alcohol, and benzyl alcohol; amide solvents such as N,N'-dimethylformamide and N,N'-dimethylacetamide; sulfoxide solvents such as dimethylsulfoxide; and heterocyclic compound solvents such as N-methyl-2-pyrrolidone; and a mixture of two or more of such solvents.

Among them, preferred solvents are aromatic hydrocarbon solvents, halogenated solvents, ester solvents, ether solvents, ketone solvents, alcohol solvents, amide solvents, sulfoxide solvents, and the like.

Among them, an organic solvent having a boiling point of 90 to 200° C. under atmospheric pressure is preferably used. Specifically preferred examples of the organic solvent include toluene, xylene, ortho-dichlorobenzene, butyl acetate, 1,4-dioxane, N,N'-dimethylformamide, N,N'-dimethylacetamide, propylene glycol monomethyl ether, and propylene glycol monomethyl ether acetate.

When the polymerization reaction is carried out in the presence of an organic solvent, the content of an organic solvent is preferably. 1% by mass to 300% by mass and more preferably 10% by mass to 100% by mass, with respect to the total mass of polymerization reactants.

The polymerization reaction is carried out under ambient pressure, under pressure in a sealed container, or under reduced pressure, and preferably under ambient pressure.

The polymerization reaction is carried out at a temperature 25° C. or more higher than the 10-hour half-life temperature of the polymerization initiator B described above. More specifically, the polymerization reaction is preferably carried out by adding dropwise a solution containing the monomer A, the polymerization initiator B, and an organic solvent into the organic solvent keeping a temperature at least 25° C. higher than the 10-hour half-life temperature of the polymerization initiator B.

More preferably, the polymerization reaction is preferably carried out at a reflux temperature of the organic solvent.

After the completion of the polymerization reaction, the obtained H-DVB-OH can be recovered by any method, and as necessary, aftertreatment such as washing may be carried out. Examples of the method for recovering H-DVB-OH from the reaction solution include methods such as reprecipitation.

H-DVB-OH obtained in this manner has a weight average molecular weight (hereinafter, abbreviated to Mw) of preferably 1,000 to 2,000,000, more preferably 5,000 to 100,000, and most preferably 10,000 to 50,000, in terms of polystyrene, measured by gel permeation chromatography.

Subsequently, H-DVB-OH obtained is subjected to a process (a) of reacting with a compound having a terephthalic acid diester structure, its halide derivative, or its monocarboxylic acid derivative or to a process (b) of reacting with a halide derivative of a compound having a phenyl ester structure, and then reacting with a boronic acid derivative having a phenyl ester structure, to produce a polymer compound having a moiety exhibiting electrochromic characteristics.

The process (a) is specifically a method (i) of condensing H-DVB-OH and a halide derivative having a terephthalic acid diester structure in a solvent in the presence of a base or a method (ii) of condensing H-DVB-OH with a compound having a terephthalic acid diester structure or its monocarboxylic acid derivative in a solvent in the presence of an acid catalyst.

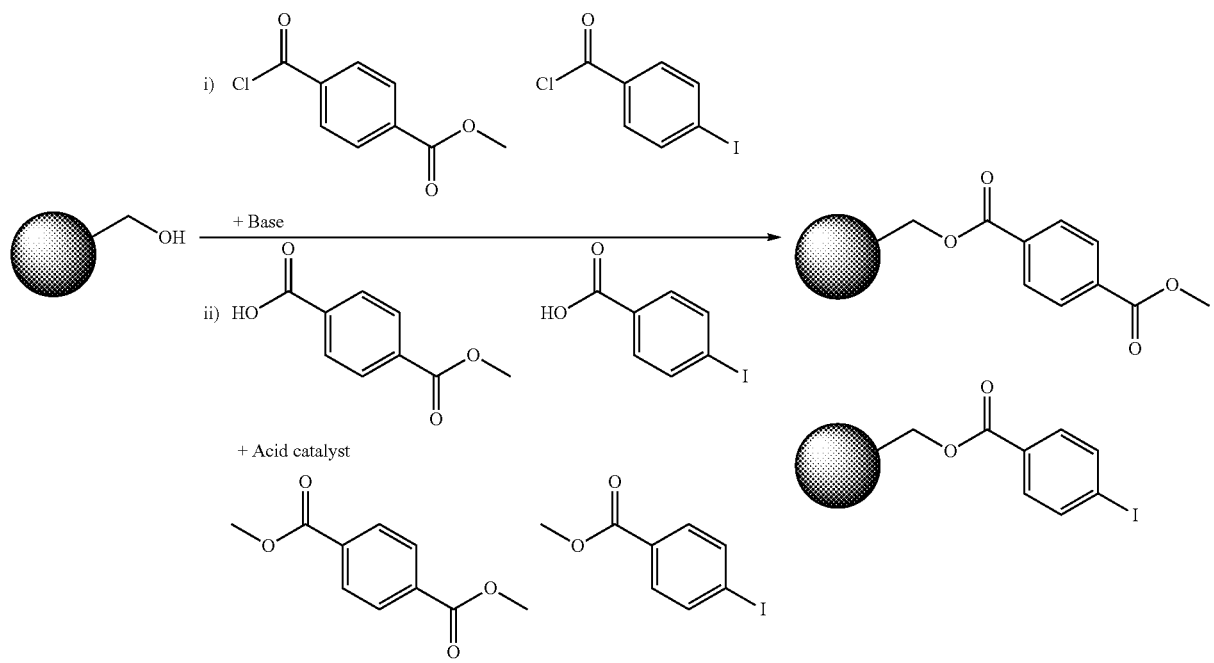

Examples of the halide derivative having a terephthalic acid diester structure in the method (i) include methyl 4-(chlorocarbonyl)benzoate, ethyl 4-(chlorocarbonyl)benzoate, propyl 4-(chlorocarbonyl)benzoate, butyl 4-(chlorocarbonyl)benzoate, pentyl 4-(chlorocarbonyl)benzoate, hexyl 4-(chlorocarbonyl)benzoate, methyl 4-(bromocarbonyl)benzoate, ethyl 4-(bromocarbonyl)benzoate, propyl 4-(bromocarbonyl)benzoate, butyl 4-(bromocarbonyl)benzoate, pentyl 4-(bromocarbonyl)benzoate, hexyl 4-(bromocarbonyl)benzoate, methyl 4-(iodocarbonyl)benzoate, ethyl 4-(iodocarbonyl)benzoate, propyl 4-(iodocarbonyl)benzoate, butyl 4-(iodocarbonyl)benzoate, pentyl 4-(iodocarbonyl)benzoate, and hexyl 4-(iodocarbonyl)benzoate.

Examples of the base used in the process include N,N'-dimethyl-4-aminopyridine (DMAP), triethylamine (TEA), and diazabicycloundecene (DBU).

Examples of the solvent used in the reaction include dimethylsulfoxide (DMF), tetrahydrofuran (THF), toluene, ethyl acetate, and a mixture of these solvents.

The reaction is generally carried out at a reaction temperature of room temperature to 150° C. for a reaction time of 10 minutes to 48 hours.

The obtained compound is recovered by any method, for example, by a method such as reprecipitation, and as necessary, aftertreatment such as washing is carried out.

Examples of the compound having a terephthalic acid diester structure and the monocarboxylic acid derivative in the method (ii) include methyl 4-(hydroxycarbonyl)benzoate, ethyl 4-(hydroxycarbonyl)benzoate, propyl 4-(hydroxycarbonyl)benzoate, butyl 4-(hydroxycarbonyl)benzoate, pentyl 4-(hydroxycarbonyl)benzoate, hexyl 4-(hydroxycarbonyl)benzoate, 1,4-dimethoxycarbonylbenzene, 1,4-diethoxycarbonylbenzene, 1,4-dipropoxycarbonylbenzene, 1,4-dibutoxycarbonylbenzene, 1,4-dipentyloxycarbonylbenzene, and 1,4-dihexyloxycarbonylbenzene.

Examples of the acid catalyst used in the process include hydrochloric acid, sulfuric acid, nitric acid, phosphoric acid, p-toluenesulfonic acid, methanesulfonic acid, trifluoromethanesulfonic acid, titanium tetrachloride, tetramethoxytitanium, tetraethoxytitanium, tetrapropoxytitanium, and tetrabutoxytitanium.

The solvents used in the method (i) can be used in this process. The reaction is generally carried out at a reaction temperature of room temperature to 150° C. for a reaction time of 10 minutes to 48 hours.

The obtained compound is recovered by any method, for example, by a method such as reprecipitation, and as necessary, aftertreatment such as washing is carried out.

In the process (b), H-DVB-OH is reacted with a halide derivative having a phenyl ester structure in a solvent in the presence of a base or an acid catalyst to give a halogenated aryl intermediate.

Examples of the halide derivatives having a phenyl ester structure used here include 4-iodobenzoyl chloride, 4-chlorobenzoyl chloride, 4-bromobenzoyl chloride, 4-iodobenzoyl bromide, 4-chlorobenzoyl bromide, 4-bromobenzoyl bromide, 4-iodobenzoyl iodide, 4-chlorobenzoyl iodide, 4-bromobenzoyl iodide, 4-chlorobenzoic acid, 4-bromobenzoic acid, 4-iodobenzoic acid, methyl 4-chlorobenzoate, methyl 4-bromobenzoate, methyl 4-iodobenzoate, ethyl 4-chlorobenzoate, ethyl 4-bromobenzoate, and methyl 4-iodobenzoate.

The bases and the solvents used in the process (a)(i) can be used in this process. The reaction is generally carried out at a reaction temperature of room temperature to 150° C. for a reaction time of 10 minutes to 48 hours. The obtained intermediate is recovered and purified by any method such as reprecipitation.

Subsequently, the halogenated aryl intermediate is subjected to cross-coupling reaction (Suzuki coupling reaction) with a boronic acid derivative having a phenyl ester structure in the presence of a palladium catalyst and a base.

Examples of the boronic acid derivative having a phenyl ester structure used here include 4-methoxycarbonylphenylboronic acid pinacol ester, 4-methoxycarbonylphenylboronic acid ethylene glycol ester, 4-methoxycarbonylphenylboronic acid, 4-methoxycarbonylphenylboronic acid dimethyl ester, 4-methoxycarbonylphenylboronic acid diethyl ester, 4-ethoxycarbonylphenylboronic acid pinacol ester, 4-ethoxycarbonylphenylboronic acid ethylene glycol ester, 4-ethoxycarbonylphenylboronic acid, 4-ethoxycarbonylphenylboronic acid dimethyl ester, and 4-ethoxycarbonylphenylboronic acid diethyl ester.

Examples of the palladium catalyst include tetrakis(triphenylphosphine)palladium(0) $(Pd(PPh_3)_4)$ and tris(dibenzylideneacetone)dipalladium(0) $(Pd_2(DBA)_3)$.

Examples of the base used in the cross-coupling reaction include potassium carbonate, sodium carbonate, lithium carbonate, potassium hydrogen carbonate, sodium hydrogen carbonate, lithium hydrogen carbonate, triethylamine (TEA), N,N'-dimethyl-4-aminopyridine (DMAP), and diazabicycloundecene (DBU).

Usually, the cross-coupling reaction is carried out at a reaction temperature of room temperature to 150° C. for a reaction time of 1 to 48 hours. The obtained compound can be recovered and purified by any method such as reprecipitation.

<Method for Preparing Varnish and Thin Film Structure>

Specific method for preparing a thin film structure containing the electrochromic material of the present invention is as follows. First, an electrochromic material is dissolved or dispersed in a solvent to make a varnish form (film-forming material). The varnish is coated on a substrate by a cast coating method, a spin coating method, a blade coating method, a dip coating method, a roll coating method, a bar coating method, a die coating method, an ink-jetting method, a printing method (relief, intaglio, planographic, screen printing, or the like) or the like. Then, the varnish is dried with a hot plate, an oven, or the like to form a film.

Among these coating methods, the spin coating method is preferred. The spin coating method has advantages that a solution with a high volatility can be used and coating can be performed with a high uniformity because coating can be performed in a short time.

Examples of the solvent used in the varnish form include, N,N'-dimethylformamide (DMF), dimethylsulfoxide (DMSO), methanol, ethanol, propanol, water, tetrahydrofuran (THF), and trichloromethane. These solvents may be used alone or as a mixture of two or more solvents.

The concentration of the electrochromic material dissolved or dispersed in the solvent may be freely selected, but the concentration is 0.001 to 90% by mass, preferably 0.002 to 80% by mass, and more preferably 0.005 to 70% by mass, with respect to the gross mass (total mass) of the electrochromic material and the solvent.

The formed layer of the electrochromic material of the present invention usually has a thickness of 0.01 μm to 50 μm and preferably 0.1 μm to 20 μm.

As necessary, in addition to the electrochromic material of the present invention, other compounds helping the chromogenic effect may be combined to form a film or a layer.

<Method for Preparing Electrochromic Device>

The electrochromic device of the present invention includes two conductive substrates of which at least one is transparent, an ion conductive substance layer that is provided between these substrates, and an electrochromic chromogenic layer that is provided between the ion conductive substance layer and one of the conductive substrates. The electrochromic chromogenic layer is characterized by containing the electrochromic material of the present invention. A typical configuration example of the electrochromic device of the present invention is shown in FIG. 1.

As shown in FIG. 1, an example of the electrochromic device of the present invention has a first lamination and a second lamination. The first lamination includes a transparent conductive substrate in which a transparent electrode layer 2 is formed on one face of a transparent substrate 1, and includes an electrochromic chromogenic layer 3 that is formed on one face of the transparent conductive substrate. The second lamination (transparent conductive substrate) includes a transparent substrate 6 and a transparent electrode layer 5 that is formed on one face of the transparent substrate 6. The electrochromic chromogenic layer 3 in the first lamination is arranged to face the transparent electrode layer 5 in the second lamination with a suitable gap therebetween, and in the gap, an ion conductive substance layer 4 having an ion conductive substance is interposed.

When voltage is applied between the electrodes, the device generates the electrochromic phenomenon, and thus color appears and disappears. Conventional means are used for applying voltage.

The method for forming the film and the layer each included in the electrochromic device of the present invention is not specifically limited, and the film and the layer can be formed by a conventional method.

Figure 2:
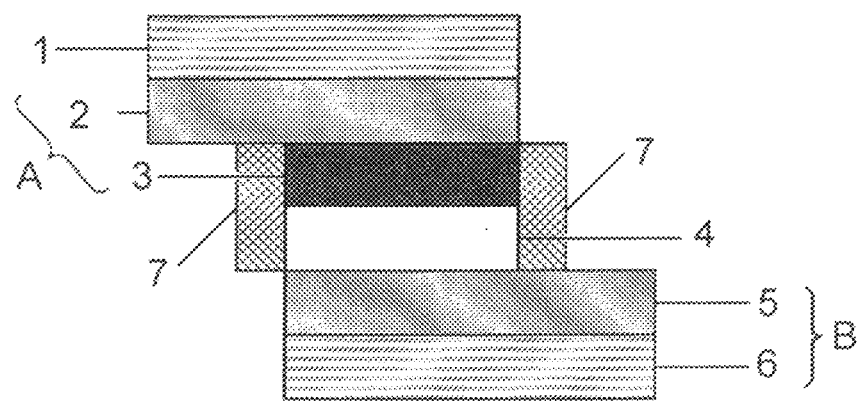
FIG. 2 is a sectional view showing another configuration example of the electrochromic device of the present invention.

For example, as shown in FIG. 2, as the transparent conductive substrate in which the transparent electrode layer 2 is formed on one face of the transparent substrate 1, a glass substrate with ITO is employed, and on the substrate, for example, by the method exemplified in <Method for Preparing Thin Film Structure> described above, the electrochromic chromogenic layer 3 containing an electrochromic material is formed to prepare the first lamination (lamination plate A). The glass substrate with ITO is also employed as the second lamination (lamination plate B).

The electrochromic chromogenic layer 3 of the lamination plate A is arranged to face the transparent electrode layer 5 of the lamination plate B with a gap of about 1 to 1000 μm, and the periphery except for an inlet is sealed with a sealant 7 to prepare an empty cell with the inlet. From the inlet, a liquid ion conductive substance is poured, the inlet is suitably sealed to form the ion conductive substance layer 4, and thus the electrochromic device is completed.

Alternatively, on the chromogenic layer 3 of the lamination plate A (or the electrode layer 5 of the lamination plate B), a liquid ion conductive substance is added dropwise. The lamination plate B (or the lamination plate A) is laminated so that the electrode layer 5 of the lamination plate B (or the chromogenic layer 3 of the lamination plate A) would be contact with the added ion conductive substance. Then, the periphery is sealed, and thus the electrochromic device is brought to completion.

The ion conductive substance used for the ion conductive substance layer 4 in the electrochromic device of the present invention is preferably a substance generally having an ion conductivity of $1 \times 10^{-7}$ S/cm or more at room temperature. The ion conductive substance is not specifically limited, and examples of the ion conductive substance include a liquid ion conductive substance, a gel ion conductive substance, and a solid ion conductive substance.

Among them, for example as the liquid substance, a solution dissolving a supporting electrolyte such as salts, acids, and alkalis in a solvent can be used. The solvent is not specifically limited as far as the solvent can dissolve a supporting electrolyte, but a polar solvent is specifically preferred. Specific examples of the solvent include water and polar organic solvents such as methanol, ethanol, propylene carbonate, ethylene carbonate, dimethylsulfoxide, dimethoxyethane, acetonitrile, cyclohexanone, γ-butyrolactone, γ-valerolactone, sulfolane, N,N'-dimethylformamide, dimethoxyethane, tetrahydrofuran, propionitrile, glutaronitrile, adiponitrile, methoxyacetonitrile, N,N'-dimethylacetamide, methylpyrrolidinone, dioxolane, trimethyl phosphate, and polyethylene glycol. They may be used alone or as a mixture.

The salts as the supporting electrolyte is not specifically limited, and examples of the salts include inorganic ion salts such as various alkali metal salts and alkaline earth metal salts, quaternary ammonium salts, and cyclic quaternary ammonium salts. Specifically preferred examples include salts of alkali metals such as Li, Na, and K, including $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$; quaternary ammonium salts such as $(CH_3)_4NBF_4$, $(C_2H_5)_4NBF_4$, $(n-C_4H_9)_4NBF_4$, $(C_2H_5)_4NBr$, $(n-C_4H_9)_4NBr$, $(C_2H_5)_4NClO_4$, and $(n-C_4H_9)_4NClO_4$; and cyclic quaternary ammonium salts, and mixtures of them.

In the electrochromic device of the present invention, a spacer may be used in order to keep the gap between the lamination plate A and the lamination plate B constant. The spacer is not specifically limited, and beads, fiber, or a sheet made of glass, polymer, or the like can be used. The spacer may be inserted into the gap between the opposing conductive substrates, or may be provided by a method of, for example, forming a protrusion made of insulating materials such as resin on the electrode on the conductive substrate.

The electrochromic device of the present invention is not limited to the configurations and the producing methods described above, and may have other structures or elements.

Examples of other structures or elements include an ultraviolet ray shielding layer such as an ultraviolet ray reflecting layer and an ultraviolet ray absorbing layer, and in the case of the application for electrochromic mirrors, an overcoat layer for protecting a whole mirror layer or a surface of each film layer.

EXAMPLES

Hereinafter, the present invention will be described in further detail with reference to examples, but the examples do not unreasonably limit the present invention.

Manufacturers of reagents and measurement equipments used in Synthetic Examples and Examples are listed below.

[Reagents]

4,4'-Bipyridyl (>98.0%): TOKYO CHEMICAL INDUSTRY CO., LTD.

Triethylene glycol monomethyl ether (>98.0%): TOKYO CHEMICAL INDUSTRY CO., LTD.

Ethylene glycol monoisopropyl ether (>99.0%): TOKYO CHEMICAL INDUSTRY CO., LTD.

p-Toluenesulfonic acid chloride (>97.0%): Wako Pure Chemical Industries, Ltd.

HBPS-Br (hyperbranched poly(vinyl-4-benzyl bromide)): Nissan Chemical Industries, Ltd.

4-Hexylaniline (>98.0%): Wako Pure Chemical Industries, Ltd.

Divinylbenzene (DVB): Nippon Steel Chemical Co., Ltd. (DVB-960)

2,2'-Azobis[2-methyl-N-(2-hydroxyethyl)propionamide]: Otsuka Chemical Co., Ltd. (VA-086, 10-hour half-life temperature: 86° C.)

4-Iodobenzoyl chloride: Aldrich

4-Methoxycarbonylphenylboronic acid pinacol ester: Aldrich

Methyl 4-(chlorocarbonyl)benzoate: TOKYO CHEMICAL INDUSTRY CO., LTD.

[Measurement Equipments]

(1) Spectrophotometer:

Hitachi High-Technologies Corporation, U-4100 UV-Visible-NIR Spectrophotometer (2) $^1H$ NMR spectrum (Synthetic Examples 1 to 5, Synthetic Examples 7 to 10):

Bruker, AVANCE 400 (400 MHz)

(3) $^1H$ NMR spectrum, $^{13}C$ NMR spectrum (Synthetic Examples 11 to 12)

JEOL DATUM LTD., JNM-ECA700

Solvent: $CDCl_3$ or DMSO

Internal standard: tetramethylsilane (4) Light source:

Hamamatsu Photonics K.K., Xenon lamp E7536

(5) Optical filter:
 Toshiba Glass Co. Ltd. (at present: Asahi Techno Glass Corporation)
(6) Detector:
 OptoSirius Corporation, Ocean Optics USB4000
(7) Potentiostat:
 Nikko Keisoku, Potentiostat NPGS-301
(8) Function generator:
 NF Corporation, Function generator FG-121B
(9) Spin coater:
 Kyowa Riken, K-359SD-2 SPINNER
(10) Laser microscope:
 Keyence Corporation, Ultradeep three-dimensional profile microscope VK-8510
(11) Gel permeation chromatography (GPC):
 TOSOH CORPORATION, HLC-8220 GPC
 Column: Shodex (registered trademark) KF-804L, KF-805L
 Column temperature: 40° C.
 Solvent: tetrahydrofuran
 Detector: RI

[1] Synthetic Example 1

Synthesis of HBPS-EC8 (OTs⁻, Br⁻)

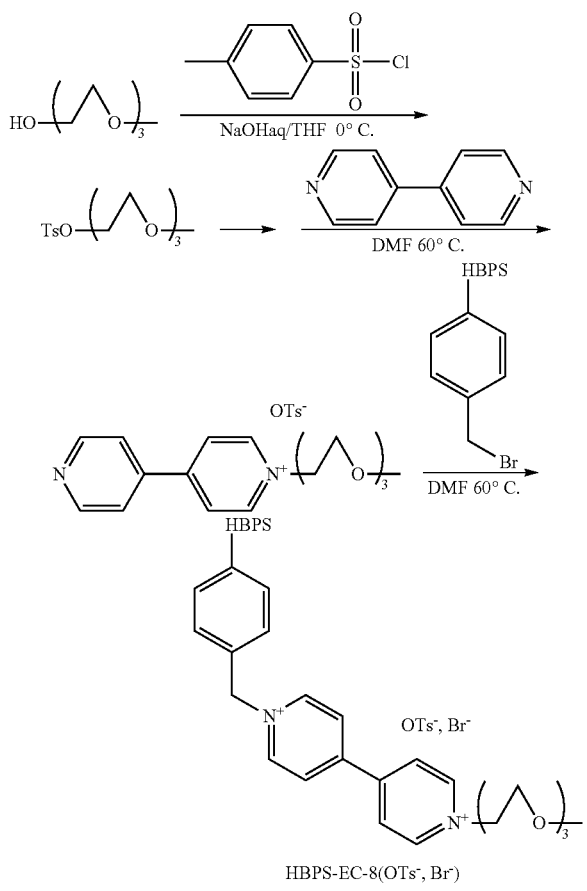

Synthesis of 2-[2-(2-Methoxyethoxy)ethoxy]ethyl p-tosylate

Into a reaction vessel, 50 mL of THF, 3.185 g of NaOH dissolved in 50 mL of water, and 10.00 g (61 mmol) of triethylene glycol monomethyl ether were added, and the whole was stirred at 0° C.

Into the reaction vessel, 12.85 g (67 mmol) of p-tosyl chloride dissolved in 40 mL of THF was slowly added dropwise. After the addition, the mixture was allowed to reach room temperature and stirred overnight. The solution was acidified with diluted sulfuric acid, and then extracted with dichloromethane. The extract was washed with a saturated brine three times. After washing, the organic phase was dried over magnesium sulfate, and filtered. The filtrate was concentrated and the concentrate was purified by silica gel column (solvent: hexane alone to hexane:chloroform=4:1) to give 14.35 g (41 mmol) of 2-[2-(2-methoxyethoxy)ethoxy]ethyl p-tosylate as a colorless liquid (yield: 67%).

Synthesis of {1-[2-(2-(2-Methoxyethoxy)ethoxy) ethyl]-4,4'-bipyridinium}p-tosylate Under a nitrogen atmosphere, to a reaction vessel, 788 mg (5.05 mmol) of 4,4'-bipyridyl, 2.20 g (6.20 mmol) of 2-[2-(2-methoxyethoxy)ethoxy]ethyl p-tosylate, and 50 mL of acetonitrile were added. The mixture was stirred at room temperature for 1 hour, and subsequently refluxed at 60° C. overnight.

The reaction mixture was allowed to reach room temperature, and then the solvent was removed by evaporation. The residue was purified by silica gel column (solvent: methanol:acetone=4:6) to give 1.396 mg (2.73 mmol) of {1-[2-(2-(2-methoxyethoxy)ethoxy)ethyl]-4,4'-bipyridinium}p-tosylate as a yellow liquid (yield: 54%).

<Synthesis of HBPS-EC-8 (OTs⁻, Br⁻)>

Under a nitrogen atmosphere, to a reaction vessel, 234 mg (1.18 mmol unit) of HBPS-Br, 733 mg (1.43 mmol) of {1-[2-(2-(2-methoxyethoxy)ethoxy)ethyl]-4,4'-bipyridinium}p-tosylate, and 50 mL of N,N'-dimethylformamide were added. The whole was stirred at room temperature for 30 minutes, and subsequently refluxed at 60° C. overnight.

The reaction mixture was allowed to reach room temperature, and then the solvent was removed by evaporation. The residue was washed with tetrahydrofuran to give HBPS-EC-8 (OTs⁻, Br⁻) as a yellow solid. The EC group introduction rate was 85% from ¹H NMR measurement.

[2] Synthetic Example 2

Synthesis of HBPS-EC-10 (OTs⁻, Br⁻)

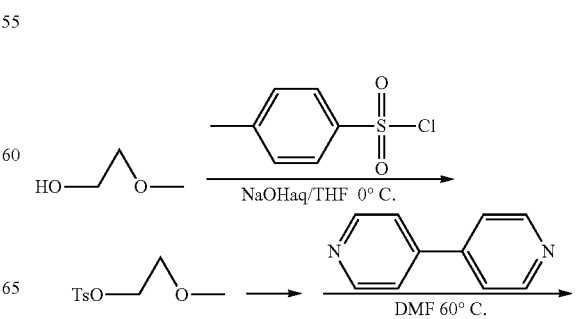

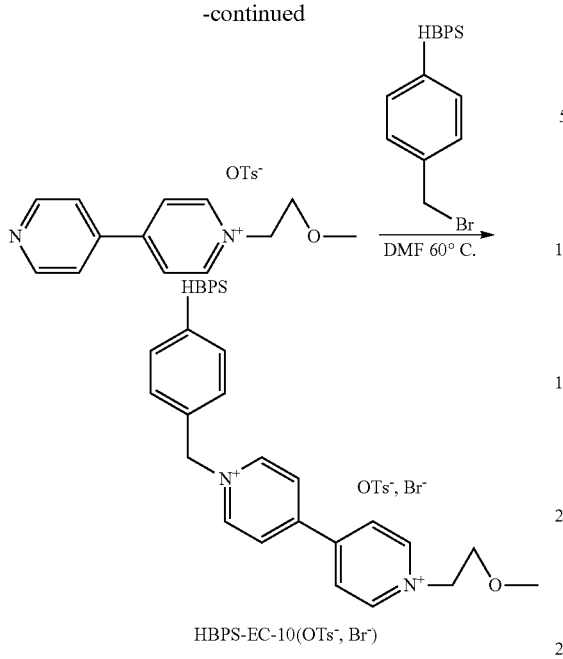

Synthesis of 2-Methoxyethyl p-Tosylate

To a reaction vessel, 60 mL of THF, 100 mL of 1.5M aqueous NaOH solution, and 7.66 g (100 mmol) of 2-methoxyethanol were added, and the whole was stirred at 0° C. To the reaction vessel, 21.264 g (110 mmol, 1.1 eq) of p-tosyl chloride dissolved in 40 mL of THF was slowly added dropwise. After the addition, the mixture was allowed to reach room temperature and stirred overnight. The solution was acidified with diluted sulfuric acid, and then extracted with ethyl acetate. The extract was washed with a saturated brine three times, and then the organic phase was dried over magnesium sulfate, and filtered. The filtrate was concentrated, and the concentrate was purified by silica gel column (solvent: hexane:ethyl acetate=4:1) to give 12.618 g (54.8 mmol) of 2-methoxyethyl p-tosylate as a colorless liquid (yield: 55%).

Synthesis of 1-(2-Methoxyethyl)-[4,4']bipyridinyl-1-ium p-Tosylate

Under a nitrogen atmosphere, to a reaction vessel, 781 mg (5.00 mmol) of 4,4'-bipyridyl, 1.725 g (7.50 mmol, 1.5 eq) of 2-methoxyethyl p-tosylate, and 50 mL of N,N'-dimethylformamide were added. The whole was stirred at room temperature for 30 minutes, and subsequently refluxed at 60° C. overnight.

The reaction mixture was allowed to reach room temperature, and then the solvent was removed by evaporation. The residue was purified by silica gel column (solvent: methanol:acetone=4:6) to give 914 mg (2.36 mmol) of 1-(2-methoxyethyl)-[4,4']bipyridinyl-1-ium p-tosylate as a yellow liquid (yield: 47%).

<Synthesis of HBPS-EC-10 (OTs⁻, Br⁻)>

Under a nitrogen atmosphere, to a reaction vessel, 202 mg (1.01 mmol unit) of HBPS-Br, 467 mg (1.20 mmol, 1.2 eq) of 1-(2-methoxyethyl)-[4,4']bipyridinyl-1-ium p-tosylate, and 50 mL of N,N'-dimethylformamide were added. The whole was stirred at room temperature for 20 minutes, and subsequently refluxed at 60° C. overnight.

The reaction mixture was allowed to reach room temperature, and then the solvent was removed by evaporation. The residue was washed with acetone to give HBPS-EC-10 (OTs⁻, Br⁻) as a yellow solid. The EC group introduction rate was 91% from $^1$H NMR measurement.

[3] Synthetic Example 3

Synthesis of HBPS-EC-15 (OTs⁻, Br⁻)

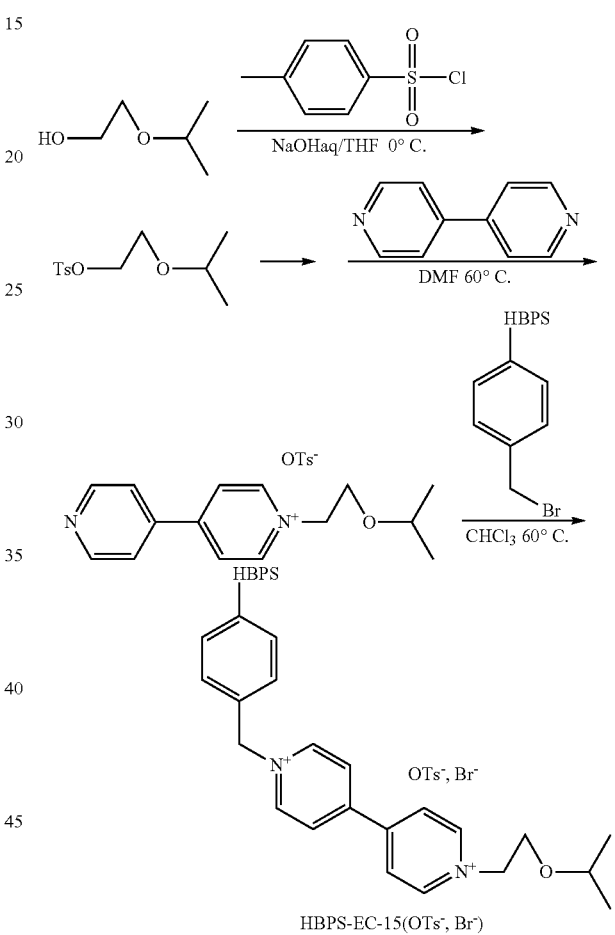

Synthesis of 2-Isopropoxyethyl p-Tosylate

To a reaction vessel, 70 mL of THF, 50 mL of 2.6M aqueous NaOH solution, and 10.468 g (101 mmol) of 2-(1-methylethoxy)ethanol were added, and the whole was stirred at 0° C.

To the reaction vessel, 20.825 g (109 mmol, 1.1 eq) of p-tosyl chloride dissolved in 70 mL of THF was slowly added dropwise. After the addition, the mixture was allowed to reach room temperature and stirred overnight. The solution was acidified with diluted sulfuric acid, and then extracted with diethyl ether. The organic phase was washed with a saturated brine three times, then dried over magnesium sulfate, and filtered. The filtrate was concentrated, and the concentrate was purified by silica gel column (solvent: hexane to chloroform) to give 16.059 g (62.2 mmol) of 2-isopropoxyethyl p-tosylate as a colorless liquid (yield: 62%).

Synthesis of 1-(2-Isopropoxyethyl)-[4,4']bipyridinyl-1-ium p-Tosylate

Under a nitrogen atmosphere, to a reaction vessel, 1.594 g (10.2 mmol) of 4,4'-bipyridyl, 3.988 g (15.4 mmol) of 2-isopropoxyethyl p-tosylate, and 60 mL of N,N'-dimethylformamide were added. The whole was stirred at room temperature for 30 minutes, and subsequently refluxed at 60° C. overnight.

The reaction mixture was allowed to reach room temperature, and then the solvent was removed by evaporation. The residue was purified by silica gel column (solvent: acetone to methanol:acetone=1:1) to give 2.132 g (5.14 mmol) of 1-(2-isopropoxyethyl)-[4,4']bipyridinyl-1-ium p-tosylate as a viscous yellow liquid (yield: 51%).

<Synthesis of HBPS-EC-15 (OTs$^-$, Br$^-$)>

Under a nitrogen atmosphere, to a reaction vessel, 196 mg (0.984 mmol unit) of HBPS-Br, 619 mg (1.49 mmol, 1.5 eq) of 1-(2-isopropoxyethyl)-[4,4']bipyridinyl-1-ium p-tosylate, and 80 mL of chloroform were added. The whole was stirred at room temperature for 30 minutes, and subsequently refluxed at 60° C. overnight.

The reaction mixture was allowed to reach room temperature, and then the solvent was removed by evaporation. The residue was washed with acetone to give 459 mg of HBPS-EC-15 (OTs$^-$, Br$^-$) as a yellow solid. The EC group introduction rate was 85% from $^1$H NMR measurement.

[4] Synthetic Example 4

Synthesis of HBPS-EC-13 (I$^-$, Br$^-$)

Synthesis of 2-Hexyl-1-iododecane

To a reaction vessel, 2.682 g (10.3 mmol) of 2-hexyl-1-chlorodecane, 7.483 g (49.9 mmol, 4.8 eq) of sodium iodide, and 100 mL of acetone were added. The whole was refluxed at 60° C. overnight. The reaction mixture was allowed to reach room temperature, and acetone was removed by evaporation. The residue was extracted with ethyl acetate, and then the organic phase was washed with a saturated brine three times. The organic phase was dried over magnesium sulfate and filtered. The filtrate was concentrated, and the concentrate was dried under vacuum to give 3.075 g (8.73 mmol) of 2-hexyl-1-iododecane as a dark red liquid (crude yield: 85%).

Synthesis of [1-(2-Hexyldecyl)-4,4'-bipyridinium]bromide

Synthesis of [1-(2-Hexyldecyl)-4,4'-bipyridinium]iodide

Under a nitrogen atmosphere, to a reaction vessel, 499 mg (3.19 mmol) of 4,4'-bipyridyl, 1.496 g (4.25 mmol, 1.3 eq) of 2-hexyl-1-iododecane, 10 mL of N,N'-dimethylformamide, and 40 mL of acetonitrile were added. The whole was stirred for 30 minutes at room temperature, and subsequently refluxed at 60° C. for 2 days. The reaction mixture was allowed to reach room temperature, and then the solvent was removed by evaporation. The procedure in which the residue was dissolved in a small amount of THF, reprecipitated with hexane and the precipitate was filtered under reduced pressure, was repeated twice to give 61 mg (120 μmol) of [1-(2-hexyldecyl)-4,4'-bipyridinium]iodide as a yellow solid (yield: 4%).

Synthesis of HBPS-EC-13 (I$^-$,Br$^-$)

Under an argon atmosphere, to a reaction vessel, 23 mg (120 μmol unit) of HBPS-Br, 61 mg (120 μmol, 1.2 eq) of [1-(2-hexyldecyl)-4,4'-bipyridinium]iodide, and 50 mL of chloroform were added. The whole was stirred for 30 minutes at room temperature, and subsequently refluxed at 60° C. overnight. The reaction mixture was allowed to reach room temperature, and then washed with a saturated brine three

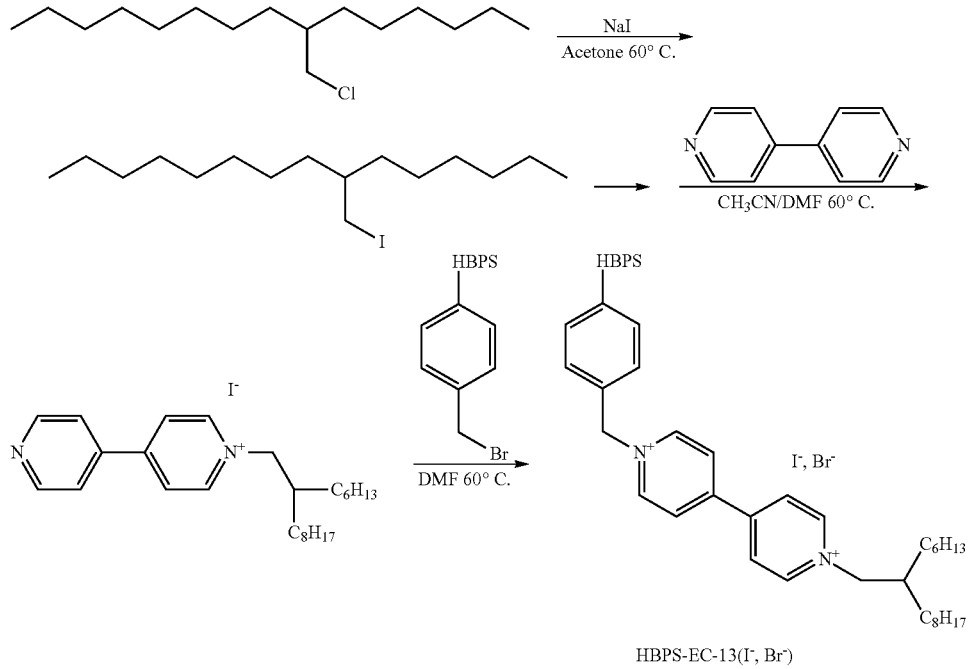

times. The organic phase was dried over magnesium sulfate and then filtered. The filtrate was concentrated and the concentrate was dried under vacuum to give HBPS-EC-13 (I⁻, Br⁻) as a red brown solid. The EC group introduction rate was 42% from ¹H NMR measurement.

[5] Synthetic Example 5

Synthesis of HBPS-EC-2 (Br⁻, I⁻)

Synthesis of HBPS-EC-2 (Br⁻, I⁻)

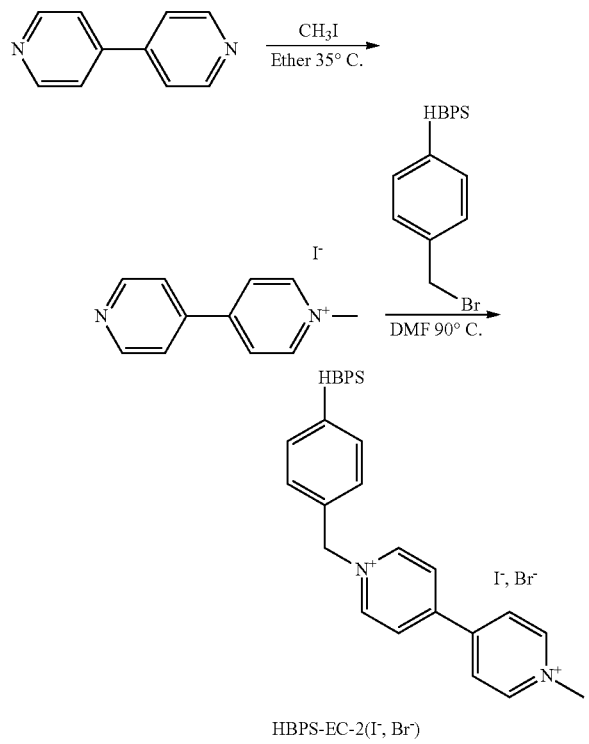

HBPS-EC-2(I⁻, Br⁻)

Under the scheme above, HBPS-EC-2 (Br⁻, I⁻) was prepared following a synthetic procedure similar to that described above.

When the obtained HBPS-EC-2 (Br⁻, I⁻) was allowed to reach room temperature, it was insolubilized in a solvent (DMF).

[6] Synthetic Example 6

Synthesis of HBPS-EC-3 (2Br⁻)

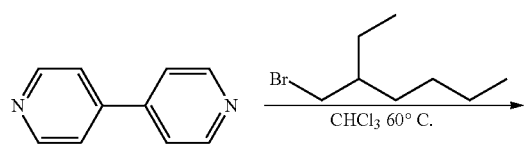

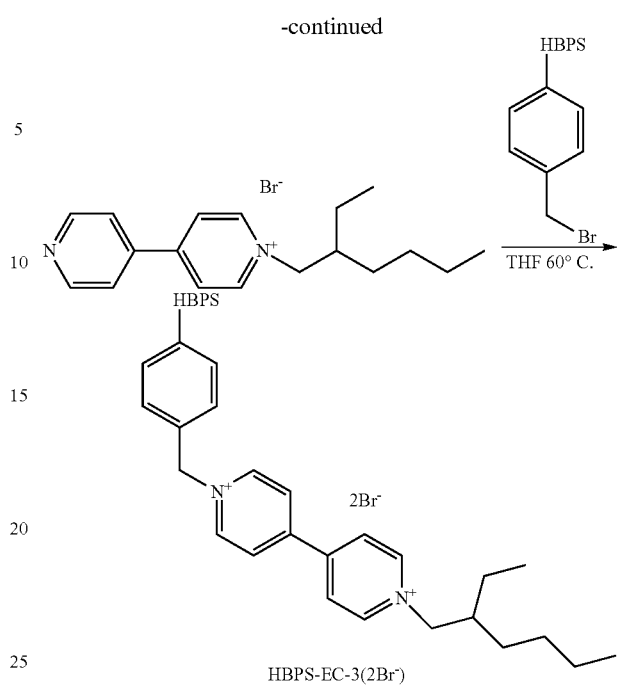

HBPS-EC-3(2Br⁻)

Under the scheme above, HBPS-EC-3 (2Br⁻) was prepared following a synthetic procedure similar to that described above.

When the obtained HBPS-EC-3 (2Br⁻) was allowed to reach room temperature, it was hard to be dissolved in a solvent (DMF).

Example 1

Electrochromic Evaluation

Using HBPS-EC-15 (OTs⁻, Br⁻) synthesized in Synthetic Example 3 (hereinafter, also simply called HBPS-EC-15), an electrochromic (EC) cell having the configuration shown in FIG. 2 was prepared using the procedure described below, and evaluated.

[Film Forming Method]
<Preparation of HBPS-EC-15 Thin Film Having a Film Thickness of 300 nm>
A 5% by mass solution of HBPS-EC-15 in methanol was prepared, and was spin coated (at 2,000 rpm for 1 minute) on an ITO glass substrate (2.0 cm×1.5 cm) to form a film of an electrochromic (EC) chromogenic layer. The film was dried under vacuum at 100° C. for 24 hours. The film thickness was determined with a laser microscope (300 nm).
<Preparation of HBPS-EC-15 Thin Film Having a Film Thickness of 500 nm>
A 10% by mass solution of EBPS-EC-15 in methanol was prepared, and was spin coated (at 2,000 rpm for 3 minutes) on an ITO glass substrate (2.0 cm×1.5 cm) to form a film of an EC chromogenic layer. The film was dried under vacuum at 100° C. for 24 hours. The film thickness was determined with a laser microscope (500 nm).
[Method for Preparing EC Cell]
Using a micropipette, 1 µL of a 0.1 M solution of tetrabutylammonium bromide in cyclohexanone that was degassed by argon bubbling for 1 hour was added dropwise on each thin film of HBPS-EC-15 prepared above. Onto the solution on the film, an ITO glass substrate was laminated and sealed with parafilm to prepare an electrochromic (EC) cell.

[Method for Evaluating EC Cell]

To the prepared EC cell (color change part: 1.5 cm×1.5 cm), a voltage of 3.2 V was applied using two dry batteries, and the transmittance at 530 nm or the change in absorbance from 400 nm to 800 nm was measured.

The measurement was carried out with Ocean Optics USB4000 using a xenon lamp (using an optical filter, wavelength less than 400 nm was shielded) as the light source. For switching between positive and negative electrodes, a switch was attached to the dry batteries and operated manually.

Figure 3:
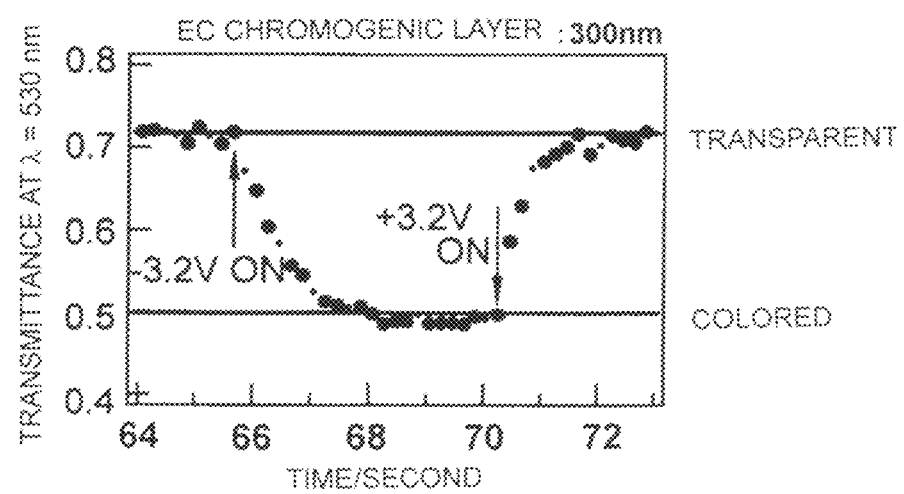
FIG. 3 is a view showing a change over time of transmittance at a wavelength of 530 nm when a positive voltage or a negative voltage is applied to an electrochromic cell (EC chromogenic layer film thickness: 300 nm) prepared in Example 1.

1) Evaluation of Coloring and Discoloring Time of EC Cell (Response Speed, FIG. 3)

When a voltage of 3.2 V was applied to the EC cell including the HBPS-EC-15 layer having a film thickness of 300 nm using as the negative electrode the ITO glass substrate on which the HBPS-EC-15 thin film was formed and as the positive electrode the opposing ITO glass substrate, coloring (purple) was immediately observed. The time for coloring was <1.4 seconds.

Next, when a voltage of 3.2 V was inversely applied using as the positive electrode the ITO glass substrate on which the HBPS-EC-15 thin film was formed and as the negative electrode the opposing ITO glass substrate, the coloring was immediately disappeared. The time for discoloring was <1.0 second.

That is, it has been ascertained that the cell has an outstanding response speed of both coloring (<1.4 seconds) and discoloring (<1.0 second).

Here, the EC cell had a transmittance of 0.72 when transparent and a transmittance of 0.5 when colored purple, at a wavelength of 530 nm.

Figure 4:
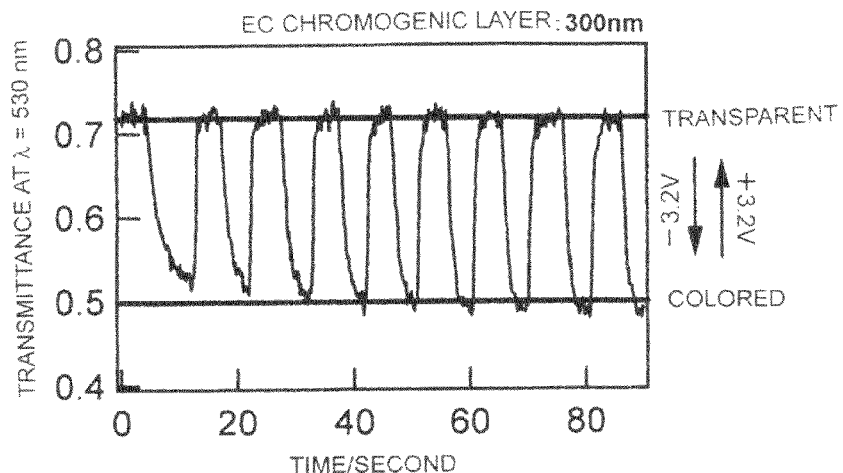
FIG. 4 is a view showing a change over time of transmittance at a wavelength of 530 nm when positive and negative voltages are repeatedly applied to the electrochromic cell (EC chromogenic layer film thickness: 300 nm) prepared in Example 1.

2) Evaluation of Repetition Characteristics of EC Cell (FIG. 4)

Using the cell used in <1) Evaluation of Coloring and Discoloring Time of EC Cell>, coloring and discoloring (positive and negative voltage application) were repeated every 5 seconds. Even when coloring and discoloring were repeated ten times or more (for 200 seconds), no residual color and the like were observed. Thus, it has been ascertained that the cell also has excellent repetition characteristics.

Figure 5:
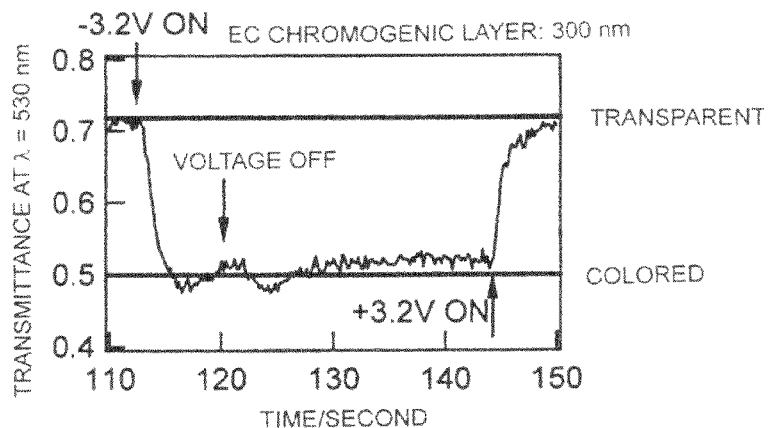
FIG. 5 is a view showing a change over time of transmittance at a wavelength of 530 nm when a voltage is applied to the electrochromic cell (EC chromogenic layer film thickness: 300 nm) prepared in Example 1, then the circuit is disconnected, and a voltage is applied again.

3) Evaluation of Color Duration of EC Cell (Memory Characteristics, FIG. 5)

Using the cell used in <1) Evaluation of Coloring and Discoloring Time of EC Cell>, when the cell was applied with a voltage to be colored, and then the circuit was disconnected to remove the voltage, the colored state continued for 20 seconds after the disconnection.

Then, when the cell was applied with a voltage with the positive and negative electrodes inverted, the color immediately disappeared and no residual color was observed. That is, it has been ascertained that the cell has memory characteristics of the coloring state for at least 20 seconds or more and can be discolored as planned by reversed voltage application.

Figure 6:
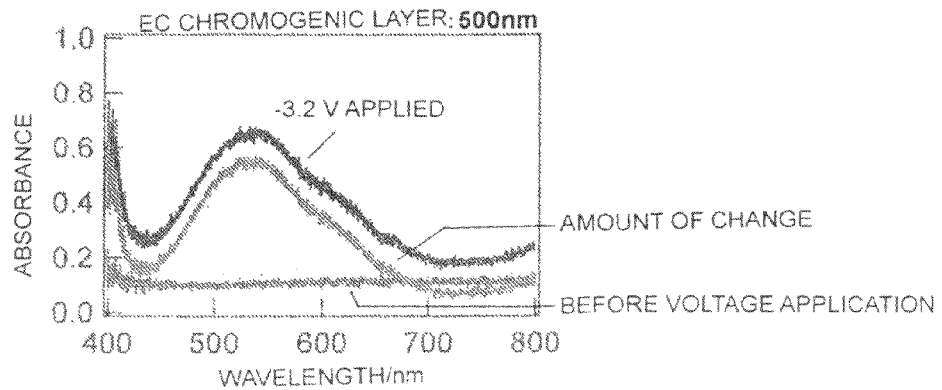
FIG. 6 is a view showing the change in absorbance (400 nm to 800 nm) of an electrochromic cell (EC chromogenic layer film thickness: 500 nm) prepared in Example 1 before voltage application and 2 seconds after the voltage application and the amount of change in absorbance.
Figure 7:
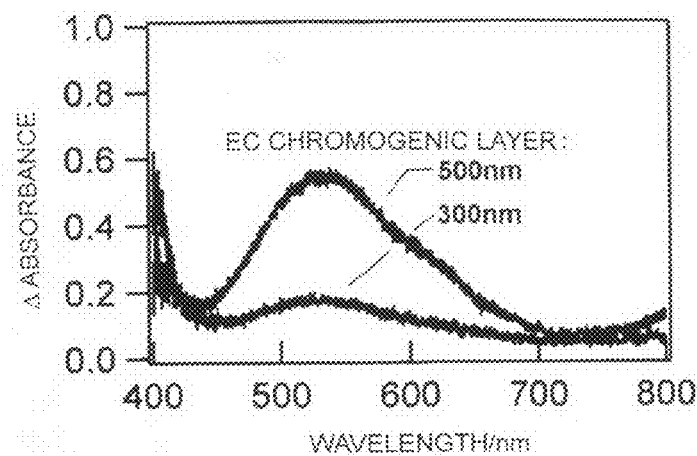
FIG. 7 is a view showing the amount of change in absorbance (400 nm to 800 nm) of the electrochromic cells (EC chromogenic layer film thickness: 300 nm and 500 nm) prepared in Example 1 before and after voltage application.

4) Amount of Change in Absorbance of EC Cell (FIG. 6, FIG. 7)

Using the EC cell including the HBPS-EC-15 layer having a film thickness of 300 nm or 500 nm, the changes in absorbance (400 nm to 800 nm) were measured before voltage application and after 2 seconds of voltage application, and the amount of change in absorbance between before and after the application was calculated. FIG. 6 shows the absorbance before and after the voltage application and the amount of change in absorbance when using the EC cell having a film thickness of 500 nm, and FIG. 7 shows each amount of change in absorbance of the cells having a film thickness of 300 nm and a film thickness of 500 nm between before and after the application.

Each of the EC cells including the HBPS-EC-15 layers having a film thickness of 300 nm and 500 nm had the absorption maximum around a wavelength of 520 to 530 nm, and the absorbance (the amounts of change) were 0.2 (film thickness: 300 nm) and 0.5 (film thickness: 500 nm). The result reveals that the cell is colored as purple and that the EC cell having a film thickness of 500 nm is colored darker. The film thickness of the EC layer and the result of absorbance (the amount of change) are not always linearly related due to local nonuniformity of a sample and the like.

The absorption around 520 to 530 nm is likely the absorption derived from a radical cation dimer of viologen, and the result suggests that the bipyridinium groups at the ends of HBPS-EC-15 readily form the radical cation dimer.

Synthetic Examples 7 to 10

Syntheses of HBPS-EC-15 (OTs$^-$, Br$^-$) Having Various Introduction Amounts of EC Group

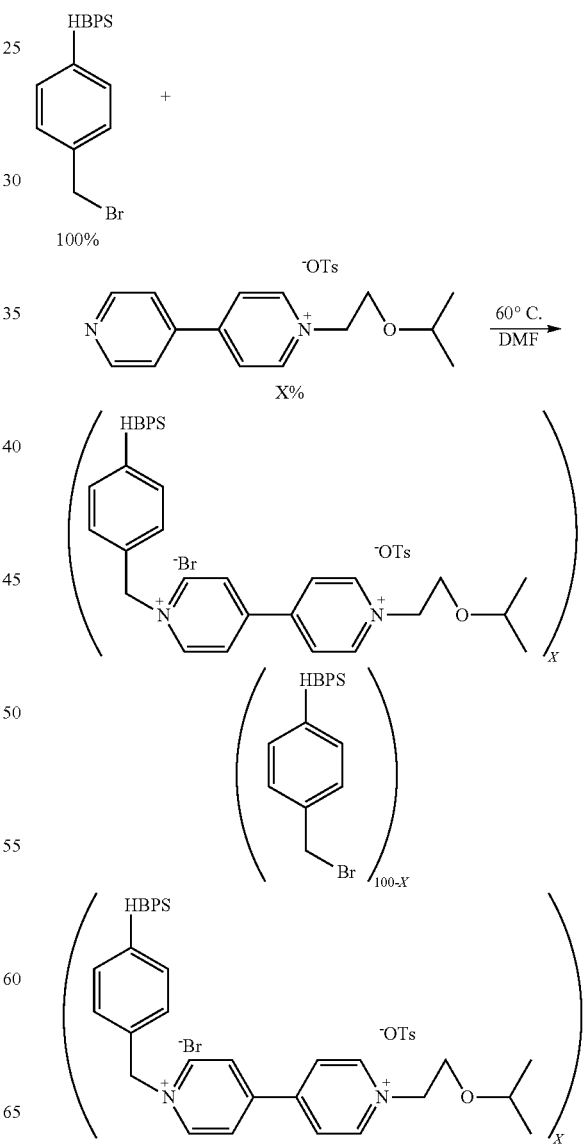

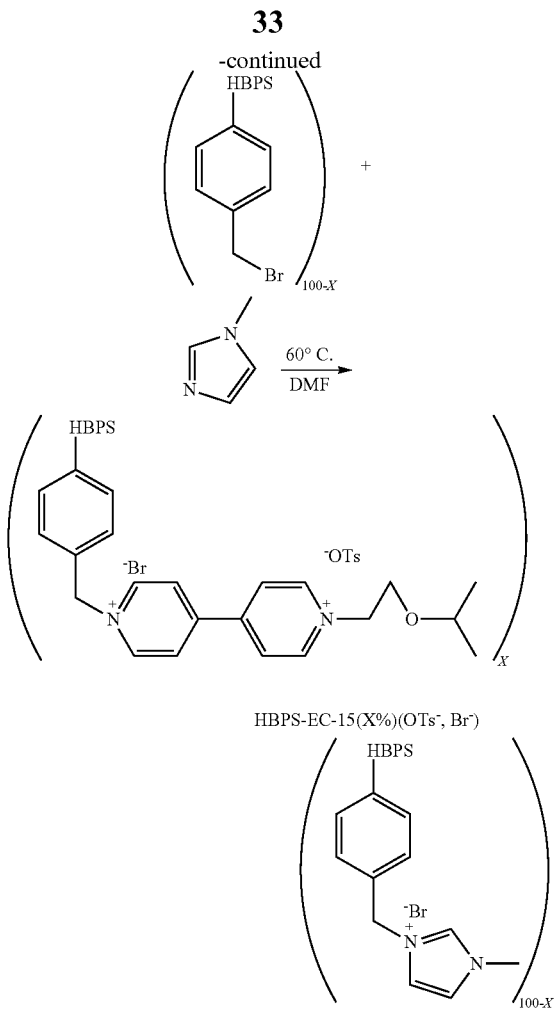

[7] Synthetic Example 7

Synthesis of HBPS-EC-15 (10%) (OTs⁻, Br⁻)

Under a nitrogen atmosphere, to a reaction vessel, 985 mg (5 mmol unit) of HBPS-Br, 207 mg (0.5 mmol) of 1-(2-isopropoxyethyl)-[4,4']bipyridinyl-1-ium p-tosylate obtained by following the procedure in Synthetic Example 3, and 50 ml of DMF were added. The whole was stirred at 60° C. for 24 hours. The solvent was concentrated, and the reaction solution was dissolved in 10 ml of DMF and 5 ml of methanol, and then reprecipitated with 200 ml of ethyl acetate. The precipitate was filtered and dried to give 980 mg of yellow solid (yield 82%). The EC group introduction rate was 17% from $^1$H NMR measurement.

To 980 mg of the yellow solid, 1.1 ml (13.5 mmol) of N-methylimidazole and 50 ml of DMF were added, and the whole was stirred at 60° C. for 24 hours. The solvent was concentrated, and the reaction solution was dissolved in 5 ml of DMF and 5 ml of methanol, and then reprecipitated with 200 ml of ethyl acetate. The precipitate was filtered and dried to give 636 mg of HBPS-EC-15 (10%) (OTs⁻, Br⁻) as a brown solid.

[8] Synthetic Example 8

Synthesis of HBPS-EC-15 (20%) (OTs⁻, Br⁻)

Under a nitrogen atmosphere, to a reaction vessel, 985 mg (5 mmol unit) of HBPS-Br, 415 mg (1 mmol) of 1-(2-isopropoxyethyl)-[4,4']bipyridinyl-1-ium p-tosylate obtained by following the procedure in Synthetic Example 3, and 50 ml of DMF were added. The whole was stirred at 60° C. for 36 hours. The solvent was concentrated, and the reaction solution was dissolved in 10 ml of DMF and 5 ml of methanol, and then reprecipitated with 200 ml of ethyl acetate. The precipitate was filtered and dried to give 1.3 g of yellow solid (yield 100%). The EC group introduction rate was 24% from $^1$H NMR measurement.

To 1 g of the yellow solid, 0.8 ml (10 mmol) of N-methylimidazole and 70 ml of DMF were added, and the whole was stirred at 60° C. for 24 hours. The solvent was concentrated, and the reaction solution was dissolved in 5 ml of DMF, and reprecipitated with 200 ml of ethyl acetate. The precipitate was filtered and dried to give 600 mg of HBPS-EC-15 (20%) (OTs⁻, Br⁻) as a brown solid.

[9] Synthetic Example 9

Synthesis of HBPS-EC-15 (50%) (OTs⁻, Br⁻)

Under a nitrogen atmosphere, to a reaction vessel, 1.182 g (6 mmol unit) of HBPS-Br, 1.244 g (3 mmol) of 1-(2-isopropoxyethyl)-[4,4']bipyridinyl-1-ium p-tosylate obtained by following the procedure in Synthetic Example 3, and 60 ml of DMF were added. The whole was stirred at 60° C. for 36 hours. The solvent was concentrated, and the reaction solution was dissolved in 10 ml of DMF, and reprecipitated with 500 ml of ethyl acetate. The precipitate was filtered and dried to give 2.34 g of yellow solid (yield 96%).

To 1 g of the yellow solid, 0.8 ml (10 mmol) of N-methylimidazole and 70 ml of DMF were added, and the whole was stirred at 60° C. for 24 hours. The solvent was concentrated, and the reaction solution was dissolved in 5 ml of DMF, and reprecipitated with 200 ml of ethyl acetate. The precipitate was filtered and dried to give 705 mg of HBPS-EC-15 (50%) (OTs⁻, Br⁻) as a brown solid.

[10] Synthetic Example 10

Synthesis of HBPS-EC-15 (80%) (OTs⁻, Br⁻)

Under a nitrogen atmosphere, to a reaction vessel, 394 mg (3 mmol unit) of HBPS-Br, 995 mg (2.4 mmol) of 1-(2-isopropoxyethyl)-[4,4']bipyridinyl-1-ium p-tosylate obtained by following the procedure in Synthetic Example 3, and 30 ml of DMF were added. The whole was stirred at 60° C. for 24 hours. The solvent was concentrated, and the reaction solution was dissolved in 5 ml of DMF, and reprecipitated with 200 ml of ethyl acetate. The precipitate was filtered and dried to give 1.06 g of yellow solid (yield 76%).

To 1.06 g of the yellow solid, 0.8 ml (10 mmol) of N-methylimiclazole and 70 ml of DMF were added, and the whole was stirred at 60° C. for 24 hours. The solvent was concentrated, and the reaction solution was dissolved in 5 ml of DMF, and reprecipitated with 200 ml of ethyl acetate. The precipitate was filtered and dried to give 880 mg of HBPS-EC-15 (80%) (OTs⁻, Br⁻) as a brown solid.

[11] Synthetic Example 11

Synthesis of HBPS-EC-15 (100%) (OTs⁻, Br⁻)

Under a nitrogen atmosphere, to a reaction vessel, 196 mg (0.98 mmol unit) of HBPS-Br, 743 mg (1.77 mmol) of 1-(2-isopropoxyethyl)-[4,4']bipyridinyl-1-ium p-tosylate obtained by following the procedure in Synthetic Example 3, and 80 ml of chloroform were added. The whole was stirred at room temperature for 30 minutes, and then stirred at 60° C. for 24 hours. The solvent was concentrated, and the concentrate was washed with acetone to give 548 mg of HBPS-EC-15 (100%) (OTs⁻, Br⁻) as a yellow solid (yield 90%).

Example 2

Evaluation of Electrochromic Characteristics by Control of EC Group Introduction Amount Using each HBPS-EC-15 having various EC group introduction rate synthesized in Synthetic Example 7 to Synthetic Example 11, an electrochromic thin film was prepared in the following manner, and the dependence of electrochromic characteristics on the EC group introduction amount rate was evaluated.

[Film Forming Method]

A 10% by mass solution of each HBPS-EC-15 (OTs⁻, Br⁻) in DMF was prepared. The solution was spin coated (at 600 rpm for 10 seconds and subsequently at 2,500 rpm for 20 seconds) on an ITO glass substrate (1.0 cm×2.0 cm) to form a film of an electrochromic (EC) chromogenic layer. The film was dried under vacuum at room temperature for 12 hours to make an EC thin film.

[Method for Evaluating EC Thin Film]

To the prepared EC thin film, a potentiostat was connected. Measurement was carried out with a three-electrode system using the ITO glass with the EC thin film as a working electrode, a platinum electrode as a counter electrode, and an Ag/Ag⁺ electrode as a reference electrode. While the voltage was changed between −0.2 V and −1.0 V, transmittance between 330 nm and 1050 nm was measured.

HR-4000 manufactured by Ocean Optics was used for the measurement.

[Change in Transmittance of EC Thin Film]

Figure 8:
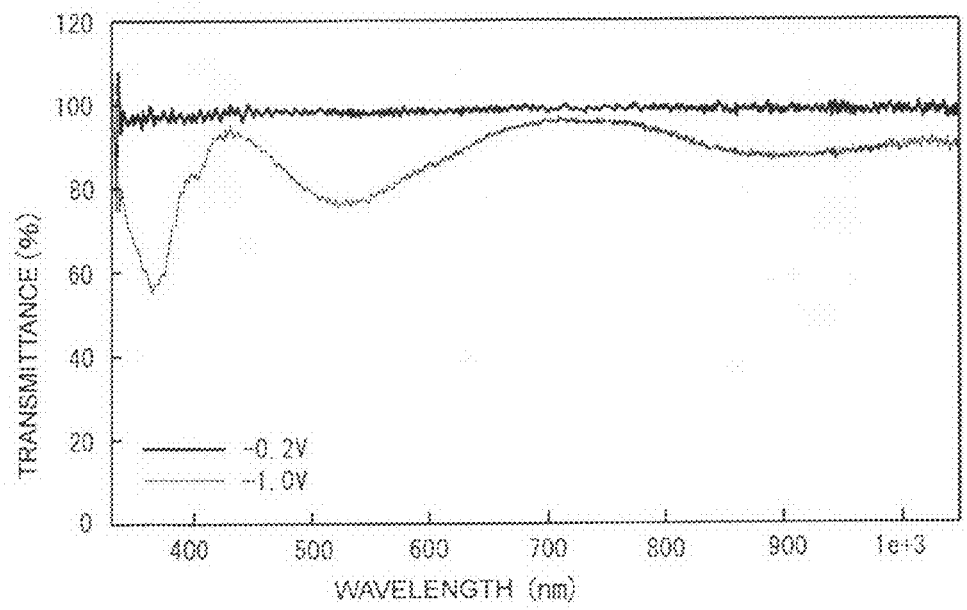
FIG. 8 is a view showing the change in transmittance (330 nm to 1050 nm), at an applied voltage of −0.2 V or −1.0 V, of an electrochromic thin film prepared from an HBPS-EC-15 (OTs⁻, Br⁻) sample having an EC group introduction amount of 100% prepared in Example 2.

Using the EC thin film prepared from the HBPS-EC-15 (OTs⁻, Br⁻) sample having an EC group introduction amount of 100%, the transmittance after the application of a voltage of −0.2 V was kept for 15 seconds and the transmittance after the application of a voltage of −1.0 V was kept for 15 seconds were measured, and the results are shown in FIG. 8.

As shown in FIG. 8, when the applied voltage was −1.0 V, the transmittance minimum was observed around a wavelength of 520 nm to 530 nm.

Figure 9:
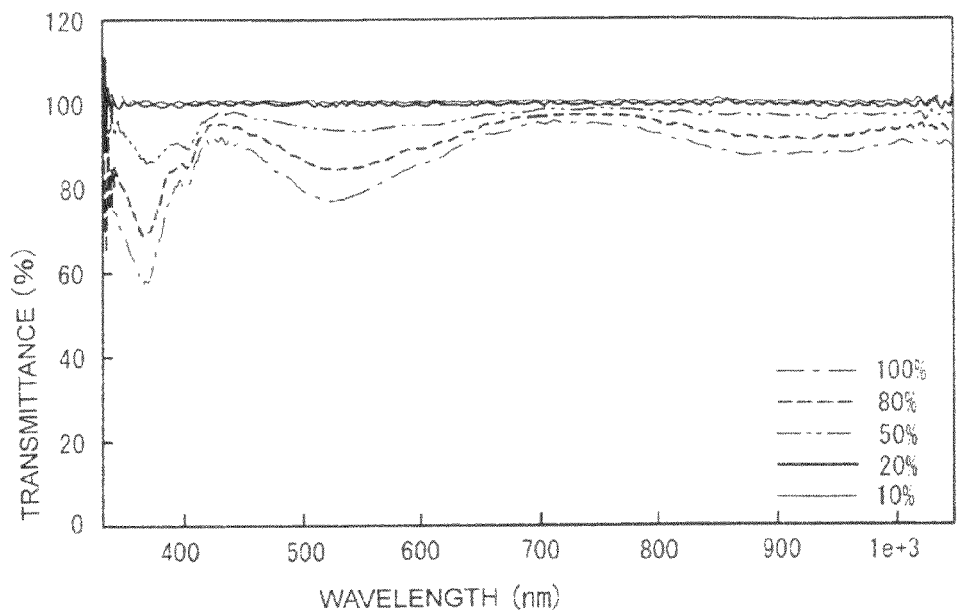
FIG. 9 is a view showing the change in transmittance (330 nm to 1050 nm), at an applied voltage of −1.0 V, of electrochromic thin films prepared from HBPS-EC-15 (OTs⁻, Br⁻) samples having various EC group introduction rates prepared in Example 2.

Furthermore, FIG. 9 shows transmittances of the EC thin films prepared from HBPS-EC-15 (OTs⁻, Br⁻) samples having various EC group introduction amounts at an applied voltage of −1.0 V.

As shown in FIG. 9, each sample having an EC group introduction amount of 50% to 100% has the minimum transmittance around a wavelength of 520 nm to 530 nm, and the transmittances at that wavelength were 94% (EC group introduction amount: 50%), 84% (EC group introduction amount: 80%), and 77% (EC group introduction amount 100%). Each sample having an EC group introduction amount of 10% to 20% had little change in the transmittance.

This result reveals that the EC thin film is colored purple, and that as the EC group introduction amount increases, the EC thin film is colored darker.

[12] Synthetic Example 12

Synthesis of H-DVB-EC (Y)

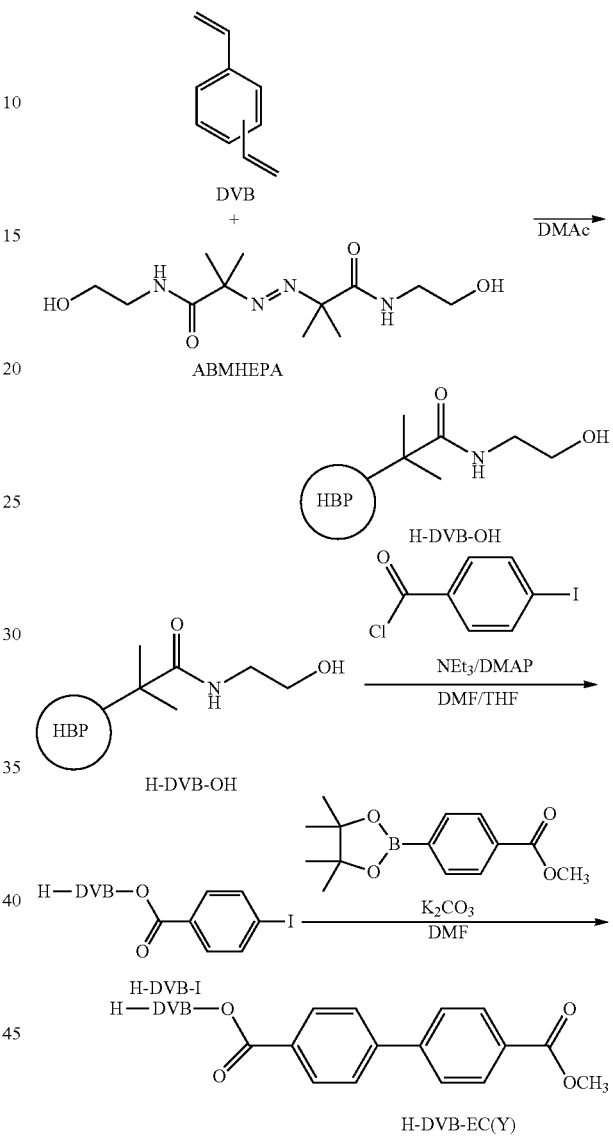

<Synthesis of Hyperbranched Polymer (H-DVB-OH)>

Into a 500 mL-reaction flask, 174 g of N,N'-dimethylacetamide (DMAc) was placed. Nitrogen was flowed in for 5 minutes with stirring and air in the flask was substitute with nitrogen. The flask was heated until the temperature in the flask reached 120° C.

Into another 200 mL-reaction flask, 6.51 g (50 mmol) of DVB, 14.4 g (50 mmol) of 2,2'-azobis[2-methyl-N-(2-hydroxyethyl)propionamide], and 230 g of DMAc were placed. Nitrogen was flowed in for 5 minutes with stirring and air in the flask was substituted with nitrogen.

Into DMAc heated at 120° C. in the 500 mL-reaction flask above, from the 200 mL-reaction flask in which DVB and 2,2'-azobis[2-methyl-N-(2-hydroxyethyl)propionamide] were placed, the content was added dropwise over 70 minutes using a dropping pump. After the completion of dropwise addition, stirring continued for additional 30 minutes.

Figure 10:
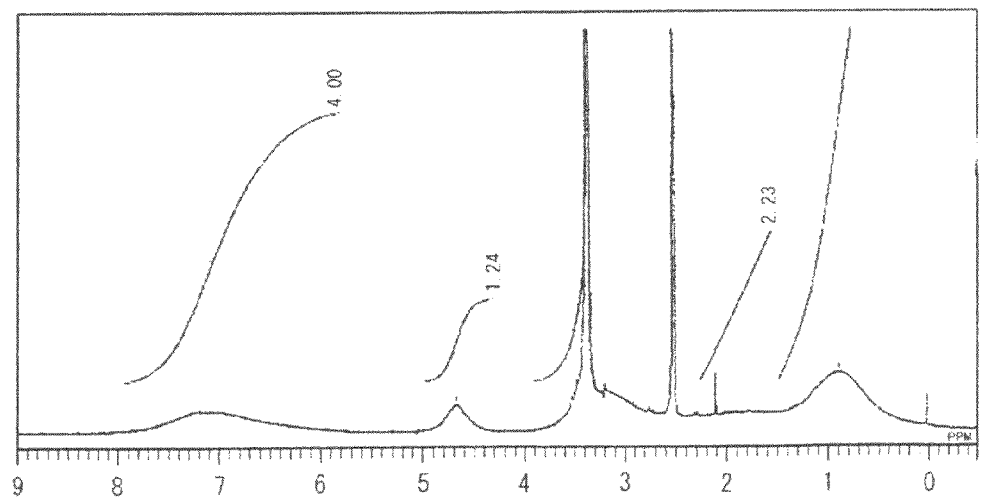
FIG. 10 is a view showing the measurement result of a $^1$H NMR spectrum of a hyperbranched polymer (H-DVB-OH) synthesized in Synthetic Example 12.

Next, from the reaction solution, DMAc was removed by evaporation using a rotary evaporator for concentration. Then, 585 g of THF was added to precipitate the polymer as slurry, and the slurry was separated by decantation. Once again, the slurry was dissolved in 40 g of methanol, and the polymer was precipitated in 585 g of THF. The precipitate was separated by filtration and dried under vacuum to give 8.1 g of the target compound as white powder. The measurement result of the NMR spectrum of the obtained target compound is shown in FIG. 10. The weight average molecular weight Mw was 23,600, in terms of polystyrene, measured by gel permeation chromatography, and the degree of distribution: Mw (weight average molecular weight)/Mn (number average molecular weight) was 1.22.

<Synthesis of H-DVB-I>

Figure 11:
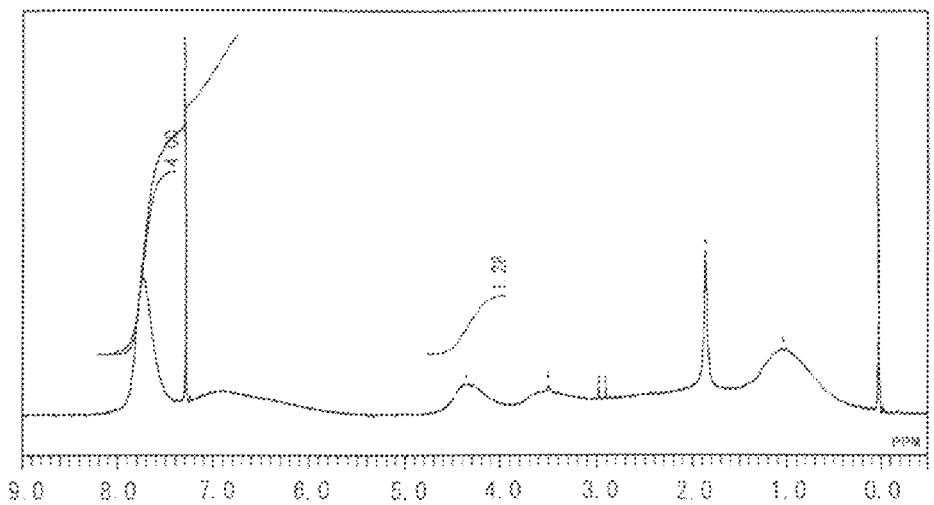
FIG. 11 is a view showing the measurement result of a $^1$H NMR spectrum of H-DVB-I synthesized in Synthetic Example 12.
Figure 12:
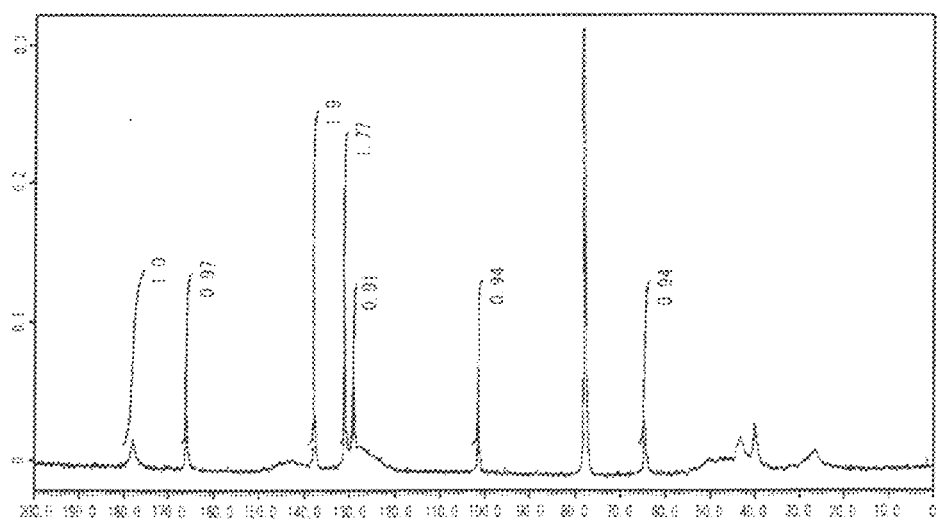
FIG. 12 is a view showing the measurement result of a $^{13}$C NMR spectrum of H-DVB-I synthesized in Synthetic Example 12.

Into a 300 mL-reaction flask, 3.0 g (11.5 mmol/OH group unit) of H-DVB-OH, 2.1 g (17.2 mmol) of N,N'-dimethyl-4-aminopyridine, and 2.3 g (23.0 mmol) of triethylamine were placed, and 120 mL of a mixed solvent of DMF/THF=1/1 (mass ratio) was added to dissolve the compounds. The whole was stirred in an ice bath for 1 hour. Into the reaction solution, 4.6 g (17.2 mmol) of 4-iodobenzoyl chloride was added. The temperature was gradually increased to room temperature, and the mixture was stirred for 20 hours. From the reaction solution, insolubles were removed by filtration. Then, the filtrate was concentrated, and the polymer was precipitated in 300 mL of methanol. The precipitate was separated by filtration and dried under vacuum to give 5.0 g of the target compound as white powder. The measurement results of $^1$H NMR and $^{13}$C NMR spectra of the obtained target compound are shown in FIG. 11 and FIG. 12. The weight average molecular weight Mw was 24,600, in terms of polystyrene, measured by gel permeation chromatography, and the degree of distribution: Mw/Mn was 1.23.

[Synthesis of H-DVB-EC(Y)]

Figure 13:
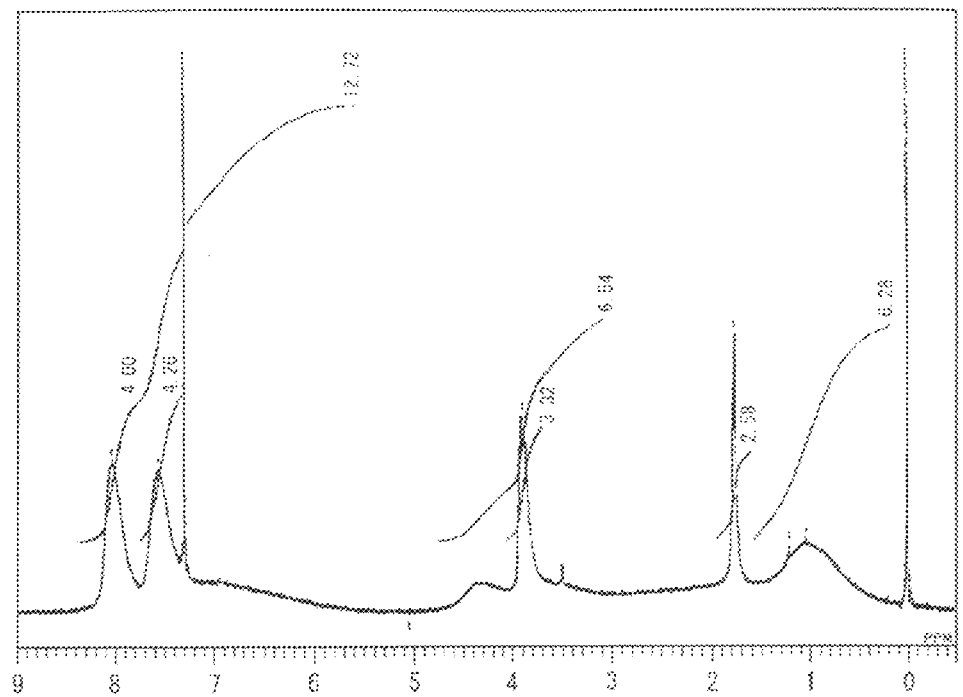
FIG. 13 is a view showing the measurement result of a $^1$H NMR spectrum of H-DVB-EC(Y) synthesized in Synthetic Example 12.

Into a 100 mL-reaction flask, 2.0 g (4.07 mmol/iodine group unit) of H-DVB-1 and 1.3 g (4.88 mmol) of 4-methoxycarbonylphenylboronic acid pinacol ester were placed, and 60 mL of DMF was added to dissolve the compounds. Then, 2.81 g (20.4 mmol) of potassium carbonate was added. Next, while stirring, nitrogen was flowed in for 5 minutes, then 47 mg (0.041 mmol) of tetrakis(triphenylphosphine) palladium(0) was added, and the whole was stirred at 90° C. for 2 hours. Insolubles were removed by filtration, and then the solvent was removed by evaporation using a rotary evaporator. Then, the polymer was precipitated in 100 mL of methanol. The precipitate was separated by filtration and dried under vacuum to give 1.9 g of the target compound as white powder. The measurement result of the $^1$H NMR spectrum of the obtained target compound is shown in FIG. 13. The weight average molecular weight Mw was 26,000, in terms of polystyrene, measured by gel permeation chromatography, and the degree of distribution: Mw/Mn was 2.14.

[13] Synthetic Example 13

Synthesis of H-DVB-EC (M)

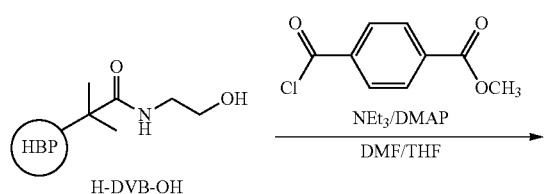

H-DVB-OH

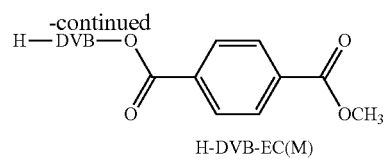

H-DVB-EC(M)

Figure 14:
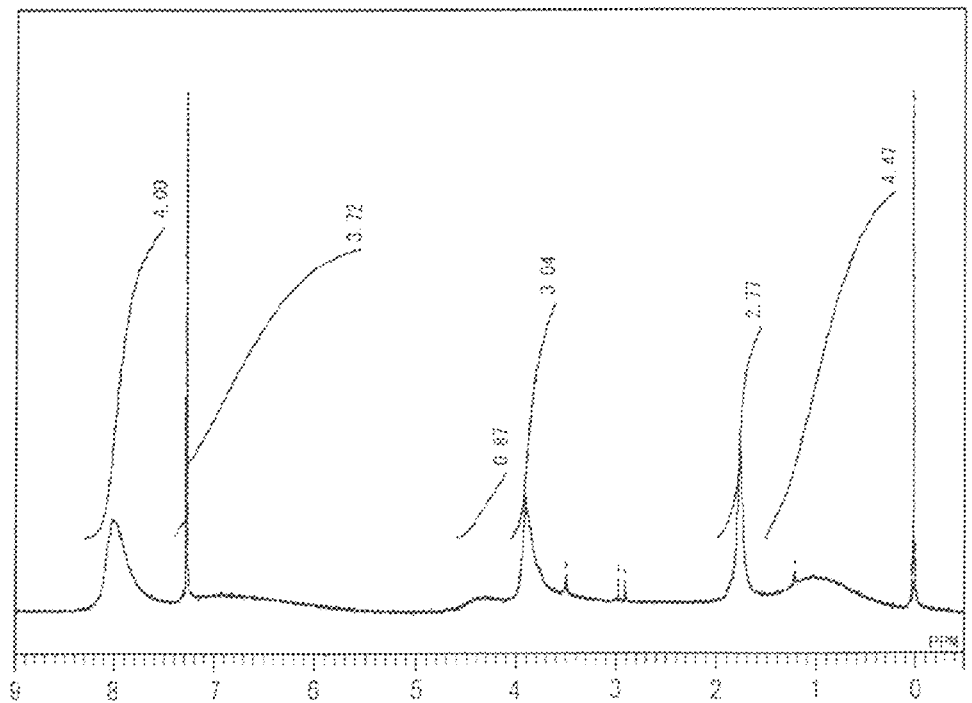
FIG. 14 is a view showing the measurement result of a $^1$H NMR spectrum of H-DVB-EC (M) synthesized in Synthetic Example 13.

Into a 100 mL-reaction flask, 1.1 g (4.0 mmol/OH group unit) of H-DVB-OH prepared in Synthetic Example 12, 0.73 g (6.0 mmol) of N,N'-dimethyl-4-aminopyridine, and 0.82 g (8.0 mmol) of triethylamine were placed, and 42 mL of a mixed solvent of DMF/THF=1/1 (mass ratio) was added to dissolve the compounds. The whole was stirred in an ice bath for 1 hour. Into the reaction solution, 1.2 g (6.0 mmol) of methyl 4-(chlorocarbonyl)benzoate was added. The temperature was gradually increased to room temperature, and the mixture was stirred for 20 hours. From the reaction solution, insolubles were removed by filtration. Then, the filtrate was concentrated, and 150 mL of methanol was added to precipitate the polymer. The precipitate was separated by filtration and dried under vacuum to give 0.89 g of the target compound as white powder. The measurement result of the $^1$H NMR spectrum of the obtained target compound is shown in FIG. 14. The weight average molecular weight Mw was 15,700, in terms of polystyrene, measured by gel permeation chromatography, and the degree of distribution: Mw/Mn was 1.26.

Example 3

Electrochromic Evaluation

Using H-DVB-EC (Y) synthesized in Synthetic Example 12, an electrochromic (EC) cell pursuant to the configuration shown in FIG. 2 was prepared and evaluated.

[Film Preparing Method]

A 2% by mass solution of each H-DVB-EC (Y) in chloroform was prepared. The solution was spin coated (at 2,000 rpm for 1 minute) on an ITO glass substrate (2.6 cm×2.2 cm) to form a film of an EC chromogenic layer. The film was dried at 40° C. for 24 hours. The film thickness was determined with a laser microscope (H-DVB-EC (Y): 200 nm, H-DVB-EC (M): 200 nm).

[Method for Preparing EC Cell]

At room temperature, 2 g of lithium perchlorate was dissolved in 10 mL of propylene carbonate, then 10 g of polymethyl methacrylate and 30 mL of acetonitrile were added, and the whole was heated to 110° C. Next, 30 mL of acetonitrile was gradually added to completely dissolve the compounds, and thus a charge transfer gel electrolyte (CT gel solution) was prepared.

The CT gel solution was added dropwise on the thin film of H-DVB-EC (Y), and on the gel solution, an ITO glass substrate was laminated. The whole was dried on a hot plate at 40° C. for 24 hours to prepare an electrochromic (EC) cell.

[Evaluation of EC Cell]

To the prepared EC cell, a voltage of –3.5 V was applied, and the change in absorbance from 300 to 600 nm was measured.

Using a xenon lamp as the light source, light through a heat cut filter and a UV cut filter was detected with Ocean Optics USB 4000 every 1 minute.

Figure 15:
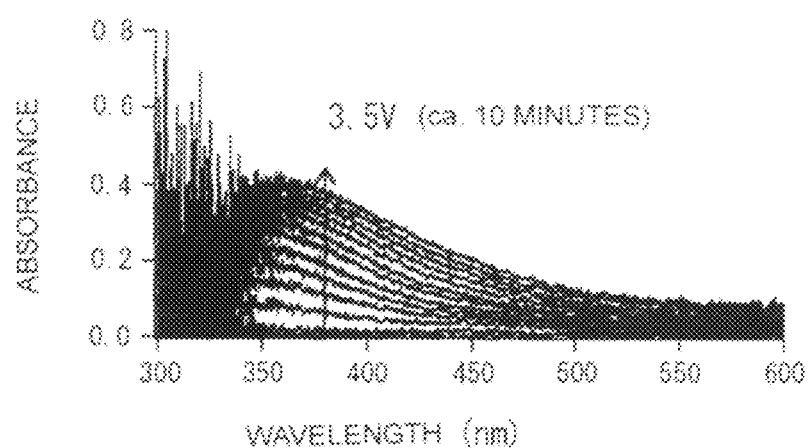
FIG. 15 is a view showing the change in transmittance (300 nm to 600 nm), at an applied voltage of −3.5 V, of an electrochromic cell prepared in Example 3.

The change in absorbance of the EC cell using H-DVB-EC (Y) is shown in FIG. 15.

As shown in FIG. 15, the absorption maximum was observed around 360 nm. The result reveals that the EC cell is colored yellow.

| | Description of the Reference Numerals |
|---|---|
| 1 | Transparent substrate |
| 2 | Transparent electrode layer |
| 3 | Electrochromic chromogenic layer |
| 4 | Ion conductive substance layer |
| 5 | Transparent electrode layer |
| 6 | Transparent substrate |
| 7 | Sealant |
| A | Lamination plate A (first lamination) |
| B | Lamination plate B (second lamination) |

DESCRIPTION OF THE REFERENCE NUMERALS

1 Transparent substrate
2 Transparent electrode layer
3 Electrochromic chromogenic layer
4 Ion conductive substance layer
5 Transparent electrode layer
6 Transparent substrate
7 Sealant
A Lamination plate A (first lamination)
B Lamination plate B (second lamination)

The invention claimed is:

1. An electrochromic material comprising a hyperbranched polymer represented by Formula (1) below:

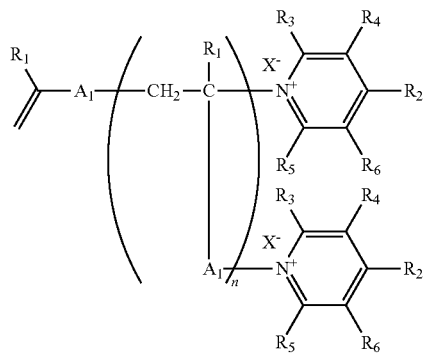

where:
$R_1$ is a hydrogen atom or a methyl group,
$R_2$ is a structure of Formula (2a):

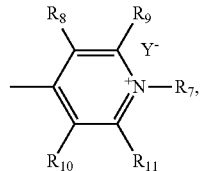

where:
$R_7$ is a 2-isopropoxyethyl group,
each of $R_8$ to $R_{11}$ is a hydrogen atom,
$Y^-$ is a bromine ion, or 4-MePhSO$_3^-$, where Ph is a phenyl group,
each of $R_3$ to $R_6$ is a hydrogen atom,
$X^-$ is a bromine ion, or 4-MePhSO$_3^-$,
$A_1$ is a structure of Formula (3):

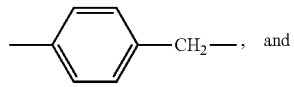

n is a number of repeating unit structures and an integer of 2 to 100,000.

2. A varnish comprising the electrochromic material as claimed in claim 1, the electrochromic material being dissolved or dispersed in at least one solvent.

3. A thin film structure comprising the electrochromic material as claimed in claim 1.

4. An electrochromic device comprising a thin film structure including the electrochromic material as claimed in claim 1, the thin film structure being interposed between two electrode layers, and at least one of the electrode layers being transparent.

* * * * *